United States Patent US 12,018,796 B2
Uccellani et al. (45) Date of Patent: Jun. 25, 2024

(54) BATTERY OPERATED GREASE GUN

(71) Applicant: MACNAUGHT PTY LTD, Turrella (AU)

(72) Inventors: Marco Uccellani, Turrella (AU); Matthias Wong, Turrella (AU)

(73) Assignee: MACNAUGHT PTY LTD, New South Wales (AU)

( * ) Notice: Subject to any disclaimer, the term of this patent is extended or adjusted under 35 U.S.C. 154(b) by 0 days.

(21) Appl. No.: 17/907,966

(22) PCT Filed: Mar. 17, 2021

(86) PCT No.: PCT/AU2021/050236
§ 371 (c)(1),
(2) Date: Aug. 29, 2022

(87) PCT Pub. No.: WO2021/184068
PCT Pub. Date: Sep. 23, 2021

(65) Prior Publication Data
US 2023/0131008 A1   Apr. 27, 2023

Related U.S. Application Data

(60) Provisional application No. 62/991,238, filed on Mar. 18, 2020.

(51) Int. Cl.
*F16N 13/14*   (2006.01)
*F16N 3/12*   (2006.01)
*F16N 13/06*   (2006.01)

(52) U.S. Cl.
CPC .............. *F16N 13/14* (2013.01); *F16N 3/12* (2013.01); *F16N 2013/063* (2013.01); *F16N 2280/00* (2013.01)

(58) Field of Classification Search
CPC ..... F16N 3/12; F16N 3/14; F16N 5/02; F16N 37/02; F16N 2013/063; G01F 11/022; F16K 15/1823
See application file for complete search history.

(56) References Cited

U.S. PATENT DOCUMENTS 1,775,946 A * 9/1930 Reid ......................... F16N 5/00
137/596.1
1,893,738 A * 1/1933 Goodman ............... F16N 13/10
222/254

(Continued)

FOREIGN PATENT DOCUMENTS

CH 663834 A5 * 1/1988 ............... F16N 5/00
CN 203215224 9/2013
TW M391608 11/2010

OTHER PUBLICATIONS

International Search Report in corresponding PCT Application No. PCT/AU2021/050236, dated May 12, 2021.
(Continued)

*Primary Examiner* — Minh Truong
(74) *Attorney, Agent, or Firm* — Norton Rose Fulbright

(57) ABSTRACT

This application relates to a battery operated grease gun comprising a body able to be connected to a container configured to store grease, the body defining first and second elongate chambers therein, the first chamber extending along a first axis and the second chamber extending along a second axis, the first axis being spaced from the second axis, and the second chamber having a smaller cross-sectional area than the first chamber; first and second pistons, the first piston configured to reciprocate within the first chamber along the first axis and the second piston configured to reciprocate within the second chamber along the second axis, the second piston having a smaller cross-sectional area than the first piston; a common grease channel, the common grease channel being disposed between the container and the first and second chambers such that the grease is able to flow from the container into the first and second chambers; an actuator connected to the body and moveable between a retracted position, whereby grease is able to flow through the common grease channel, and an engaged position, whereby grease is restricted from flowing through the common grease channel, the actuator being configured to cause reciprocation of the first piston and the second piston when moved between the engaged and retracted positions; and a grease outlet fluidically connected to the first and second chambers (Continued)

that allows for grease to be discharged from the grease gun. The battery operated grease gun may further comprise a high pressure/high flow switch in the form of a pressure-sensitive spool, bypass valve or gap-based bypass.

11 Claims, 25 Drawing Sheets

(56) References Cited

U.S. PATENT DOCUMENTS

| | | | | |
|---|---|---|---|---|
| 2,051,290 A | * | 8/1936 | Davis | F16N 5/02 222/318 |
| 3,291,350 A | * | 12/1966 | Malec | F16N 3/12 417/489 |
| 2006/0219482 A1 | * | 10/2006 | Tung | F16N 3/12 184/105.2 |
| 2007/0137942 A1 | * | 6/2007 | Weems | F16N 5/02 184/105.2 |
| 2008/0047980 A1 | * | 2/2008 | Huang | F16N 3/12 222/263 |
| 2009/0272762 A1 | | 11/2009 | Hulden | |
| 2012/0241479 A1 | | 9/2012 | Kuo | |
| 2017/0098945 A1 | * | 4/2017 | Lee | F16N 3/12 |
| 2018/0030966 A1 | | 2/2018 | Wang et al. | |
| 2018/0340652 A1 | | 11/2018 | Kawai et al. | |

OTHER PUBLICATIONS

Extended European Search Report dated Feb. 29, 2024 issued for corresponding European Application No. 21769884.4 filed Mar. 17, 2021.

\* cited by examiner

XX  YY

BATTERY OPERATED GREASE GUN

TECHNICAL FIELD

The disclosure relates to a grease gun, and in particular a battery operated grease gun.

BACKGROUND ART

Grease guns are used in a range of industries to lubricate vehicles and other machinery. These grease guns generally include a grease supply (either from an attached barrel or an external source) and a piston, which forces grease under pressure out of an outlet, for application to the relevant machinery. Grease guns can be separated into two main types; manual grease guns and power-assisted grease guns (which includes battery-operated, pneumatic and electric grease guns).

When greasing a vehicle or machinery, blocked greasing points often occur which results in high greasing pressure. Common causes of high greasing pressure include blocked Zerc fittings, long, tortuous and/or tight greasing channels and thick grease which does not flow easily. Previous systems have been developed that are able to provide additional pressure to the grease in order to clear the blockage. Some systems use an external power source to provide this additional pressure. However, this can be expensive and unwieldy.

Manual grease guns have been developed that are able to move between a high volume/low pressure mode and a low volume/high pressure mode. These systems require a user to manually switch between the two modes. More recently, systems have been developed that are able to automatically switch the grease gun into a low volume/high pressure mode when an increase in pressure due to a blockage is detected.

Existing battery operated grease guns are less complex. Most feature a single plunger pumping mechanism that is designed to reach a compromise between having a high flow (which is advantageous when the gun is not blocked to maximise outflow) and high pressure (when the gun is blocked to clear the blockage). This compromise is also driven by the inherent limitations of the capacity of batteries used to power the system, which limit the ability to deliver a high pressure and high volume system. By sitting at this compromise position, the grease gun is limited, both with respect to maximum flow and maximum blockage clearance.

In this specification where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

It is an object of the grease gun disclosed herein to provide an advantage over, or at least provide a useful alternative, to prior art grease guns, and in particular to prior art battery operated grease guns.

Disclosed herein is a battery operated grease gun comprising a body able to be connected to a container configured to store grease, the body defining first and second elongate chambers therein, the first chamber extending along a first axis and the second chamber extending along a second axis, the first axis being spaced from the second axis, and the second chamber having a smaller cross-sectional area than the first chamber; first and second pistons, the first piston configured to reciprocate within the first chamber along the first axis and the second piston configured to reciprocate within the second chamber along the second axis, the second piston having a smaller cross-sectional area than the first piston; a common grease channel, the common grease channel being disposed between the container and the first and second chambers such that the grease is able to flow from the container into the first and second chambers; an actuator connected to the body and moveable between a retracted position, whereby grease is able to flow through the common grease channel, and an engaged position, whereby grease is restricted from flowing through the common grease channel, the actuator being configured to cause reciprocation of the first piston and the second piston when moved between the engaged and retracted positions; and a grease outlet fluidically connected to the first and second chambers that allows for grease to be discharged from the grease gun.

In some forms, the grease outlet is fluidically connected to the first chamber and the second chamber by way of a third chamber connected to the first chamber and a fourth chamber connected to the second chamber.

In some forms, the first chamber is connected to the third chamber by way of a first grease channel.

In some forms, the grease gun further comprises a first non-return valve located within the first grease channel. The first non-return valve allows grease to flow from the first chamber through the first grease channel into the third chamber. Preferably, the first non-return valve restricts grease from flowing from the third chamber into the first chamber. More preferably, the first non-return valve prevents grease from flowing from the third chamber into the first chamber.

In some forms, the second chamber is connected to the fourth chamber by way of a second grease channel.

In some forms, the grease gun further comprises a second non-return valve located within the second grease channel. The second non-return valve allows grease to flow from the second chamber through the second grease channel into the fourth chamber. Preferably, the second non-return valve restricts grease from flowing from the fourth chamber into the second chamber. More preferably, the second non-return valve prevents grease from flowing from the fourth chamber into the second chamber.

In some forms, the grease gun further comprises an outlet cavity between the third chamber and the fourth chamber and the grease outlet.

In some forms, the grease gun further comprises the container, which is connected to the body and in fluid communication with the common grease channel.

In some forms, the actuator is configured to cause reciprocation of the first and second pistons in the same phase when moved between the engaged and retracted positions.

In some forms, the grease gun further comprises a link connected to the first and second pistons to maintain the first and second pistons in the same phase. Preferably, the actuator is connected to the body for rotational movement around a central axis which is perpendicular to the first axis. Preferably, the actuator further comprises a cam member. Preferably, the link contains an aperture with a cam surface that is engageable with the cam member such that the rotational movement of the actuator causes reciprocation of the link.

In some forms, the actuator is operable by way of a motor. Preferably, the motor is battery powered.

In some forms, the outlet comprises a nozzle. Preferably, the nozzle has a central axis, and the central axis of the nozzle is perpendicular to the first and second axes.

Also disclosed herein is a grease gun further comprising a first spool channel extending along a third axis, a spool moveable within the first spool channel between an open position and a closed position; and a bypass channel in fluid communication with the first chamber and the container by way of the first spool channel; wherein when the spool is in the open position, it permits the flow of grease out of the first chamber to the grease barrel, and when the spool is in the closed position, it restricts the flow of grease out of the first chamber to the grease barrel.

In some forms, in use, when the spool is in the open position, it permits the flow of grease out of the first chamber into the container and when the spool is in the closed position, it restricts the flow of grease out of the first chamber into the container. Preferably, when the spool is in the closed position, it prevents the flow of grease out of the first chamber into the container.

Also disclosed herein is a grease gun further comprising a pressure channel disposed at a first end of the spool channel, the pressure channel being in fluid communication with the outlet chamber; and a third biasing means disposed at a second end of the spool channel, the third biasing means being configured to bias the spool towards the closed position, wherein an increase in pressure in the outlet chamber causes an increase in pressure in the pressure channel and a resulting increase in pressure in at a first end of the first channel to thereby force the spool against the third biasing means. Preferably, at a predetermined level of pressure at the first end of the first channel the spool is configured to move towards the open position.

In some forms, the bypass channel comprises a primary bypass channel disposed between the first chamber and the spool channel, and a secondary bypass channel disposed between the spool channel and the container. Preferably, the primary bypass channel extends along a primary bypass channel axis and the secondary bypass channel extends along a secondary bypass channel axis, the primary bypass channel axis being offset from the secondary bypass channel axis with regard to the spool channel. More preferably, the primary bypass channel axis is substantially perpendicular to, and spaced from, the secondary bypass channel axis.

In some forms, the spool channel is connected to and disposed between the primary and secondary bypass channels such that when the spool is in the open position grease is able to flow from the primary bypass channel into the secondary bypass channel via the spool channel.

In some forms, the spool comprises a first annular ring and a second annular ring that is spaced from the first annular ring; and a mid-section that is disposed between and boundaried by the first and second annular rings; the mid-section of the spool having a smaller diameter than a diameter of the spool channel and a diameter of the first and second annular rings; wherein an area disposed between the mid-section of the spool and a wall of the spool channel forms a communication channel, the communication channel being in fluid communication with the primary bypass channel regardless of whether the spool is in the open position or the closed position.

In some forms, the spool comprises a cavity that extends through the spool, the cavity being disposed in the mid-section of the spool to allow grease to flow through the mid-section of the spool and fill the communication channel.

In some forms, when the spool is in the closed position, the communication channel is not located adjacent to the secondary bypass channel, thereby restricting the flow of grease from the spool channel into the secondary bypass channel and when the spool is in the open position, the communication channel is located adjacent to the secondary bypass channel, thereby permitting the flow of grease into the secondary bypass channel.

Also disclosed herein is a grease gun further comprising a first bypass valve, the first bypass valve being disposed within the first grease channel and having an open configuration and a closed configuration, wherein the first bypass valve is in the open configuration grease is able to flow from the first chamber into the third chamber and when the first bypass valve is in the closed configuration grease is restricted from flowing from the first chamber into the third chamber; wherein the first bypass valve is configured to be in the closed configuration when the pressure in the first chamber is less than the pressure in the third chamber and configured to be in the open configuration when the pressure in the first chamber is greater than the pressure in the third chamber.

Also disclosed herein is a grease gun wherein the first chamber has a first diameter, and the first piston has a second diameter, wherein the second diameter is smaller than the first diameter such that a radial gap is formed between the first chamber and the first piston, wherein when the pressure in the first chamber reaches a predetermined level, upon reciprocation of the first piston from the retracted position to the engaged position, grease is forced along the radial gap in the first chamber into the common grease channel.

In some forms, the second chamber has a third diameter, and the second piston has a fourth diameter, wherein the third diameter and the fourth diameter are sized such that grease is restricted from flowing between the second chamber and the second piston into the common grease channel.

Also disclosed herein is a grease gun further comprising engagement means on the body of the grease gun for attachment to corresponding engagement means on the container.

In some forms, the engagement means comprise an outer collar and an inner collar, wherein the outer collar is axially movable on the inner collar between a locked position where the inner collar can secure the container to the body of the grease gun and an unlocked position where the container can be released from the body. Preferably, the inner collar comprises a collar ball channel containing collar locking balls, which are engageable with a corresponding groove on the container. Preferably, in the locked position the container is held to the body by the engagement of the collar locking balls of the collar ball channel with the corresponding groove on the container. Preferably, the collar locking balls have an engaged position within the collar ball channel where they are engageable with the corresponding groove on the container, and a disengaged position within the collar ball channel where they are not engageable with the corresponding groove on the container. Preferably, the collar locking balls are in the engaged position when the outer collar is located on the inner collar in a position adjacent to the collar ball groove and are in the disengaged position when the outer collar is located on the inner collar in a position not adjacent to the collar ball groove.

In some forms, the outer collar further comprises a tab. Preferably, the outer collar is movable between the locked position and the unlocked position by rotation of the tab.

In some forms, the grease gun may further comprise; a first pressure relief channel that fluidically connects the first chamber to the barrel; and a first pressure relief valve disposed within the first pressure relief channel, the first pressure relief valve being configured to open and thereby allow grease to flow from the first chamber to the barrel when the pressure in the first chamber is at or above a predetermined pressure.

In some forms, the grease gun may further comprise; a first monitoring channel spaced from the first pressure relief channel; a connecting channel that fluidically connects the first monitoring channel to the first pressure relief channel; an a first monitoring spool disposed within the first monitoring channel, the first monitoring spool being configured to translate within the first monitoring channel along a longitudinal axis of the first monitoring channel between a closed and open position, wherein when the first monitoring spool is in the open position, grease is able to flow from the first chamber to the grease barrel via the connecting channel.

In some forms, the grease gun may further comprise; a first magnet mounted to the first monitoring spool; and a proximity sensor disposed adjacent the magnet, the proximity sensor being configured to generate a signal that is indicative of the position of the magnet.

In some forms, the grease gun may further comprise; a second pressure relief channel that fluidically connects the outlet to the barrel; and a second pressure relief valve disposed within the second pressure relief channel, the second pressure relief valve being configured to open and thereby allow grease to flow from the outlet to the barrel when the pressure in the outlet is at or above a predetermined pressure.

In some forms, the grease gun may further comprise; a second monitoring channel spaced from the second pressure relief channel; a second connecting channel that fluidically connects the second monitoring channel to the second pressure relief channel; and a second monitoring spool disposed within the second monitoring channel, the second monitoring spool being configured to translate within the second monitoring channel along a longitudinal axis of the second monitoring channel between a closed and open position, wherein when the second monitoring spool is in the open position, grease is able to flow from the outlet to the grease barrel via the second connecting channel.

In some forms, the grease gun may further comprise; a second magnet mounted to the second monitoring spool; and a second proximity sensor disposed adjacent the second magnet, the second proximity sensor being configured to generate a signal that is indicative of the position of the second magnet.

In some form, the grease gun may comprise a controller configured to receive the signals generated by the first and second proximity sensors, the controller being configured to determine information about the grease gun in dependence on the signals generated by the first and second proximity sensors; and an LCD configured to display the determined information. In an embodiment that includes only one of the hydraulic switches (e.g. only the first or second pressure relief valve described above), the controller may be configured to receive the signal of the one hydraulic switch and determine information about the grease gun in dependence on that signal.

BRIEF DESCRIPTION OF DRAWINGS

Various embodiments/aspects of the disclosure will now be described with reference to the following drawings in which.

DETAILED DESCRIPTION

A grease gun will now be described with reference to a FIGS. 1 to 30.

Figure 1:
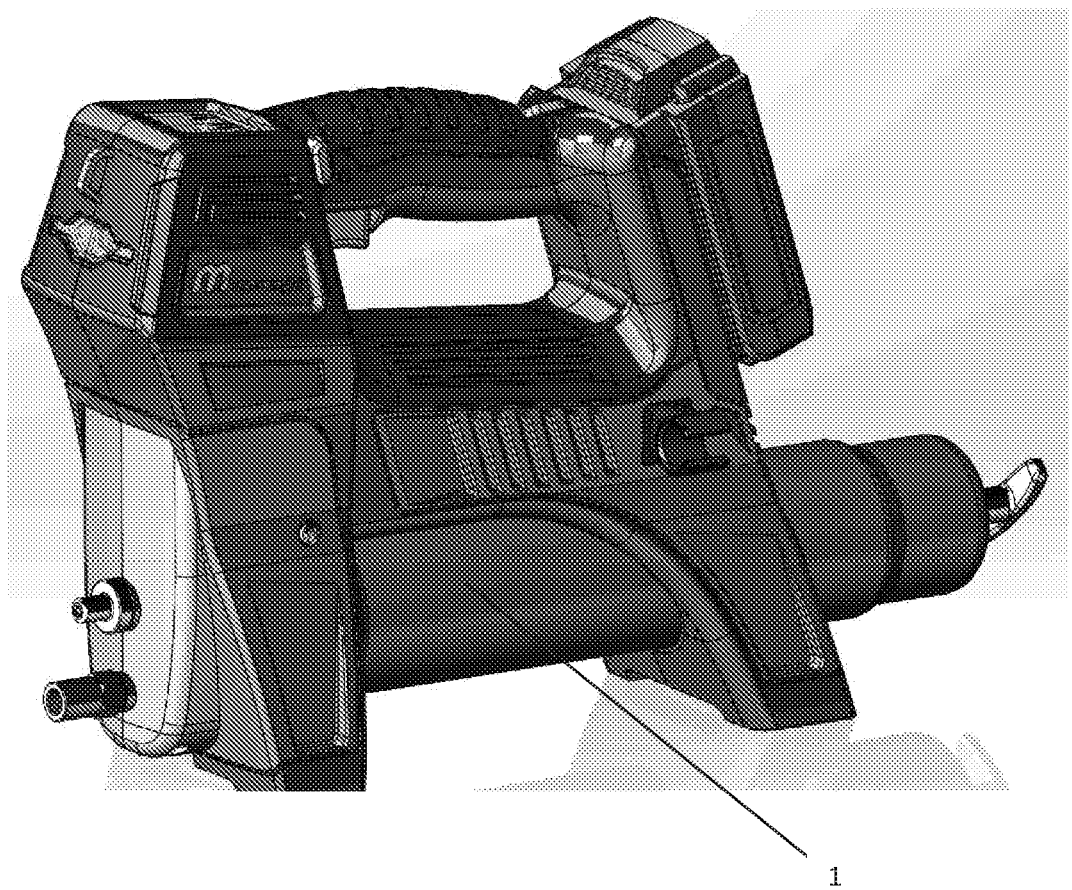
FIG. 1 is an image of a grease gun in accordance with the present invention.
Figure 2:
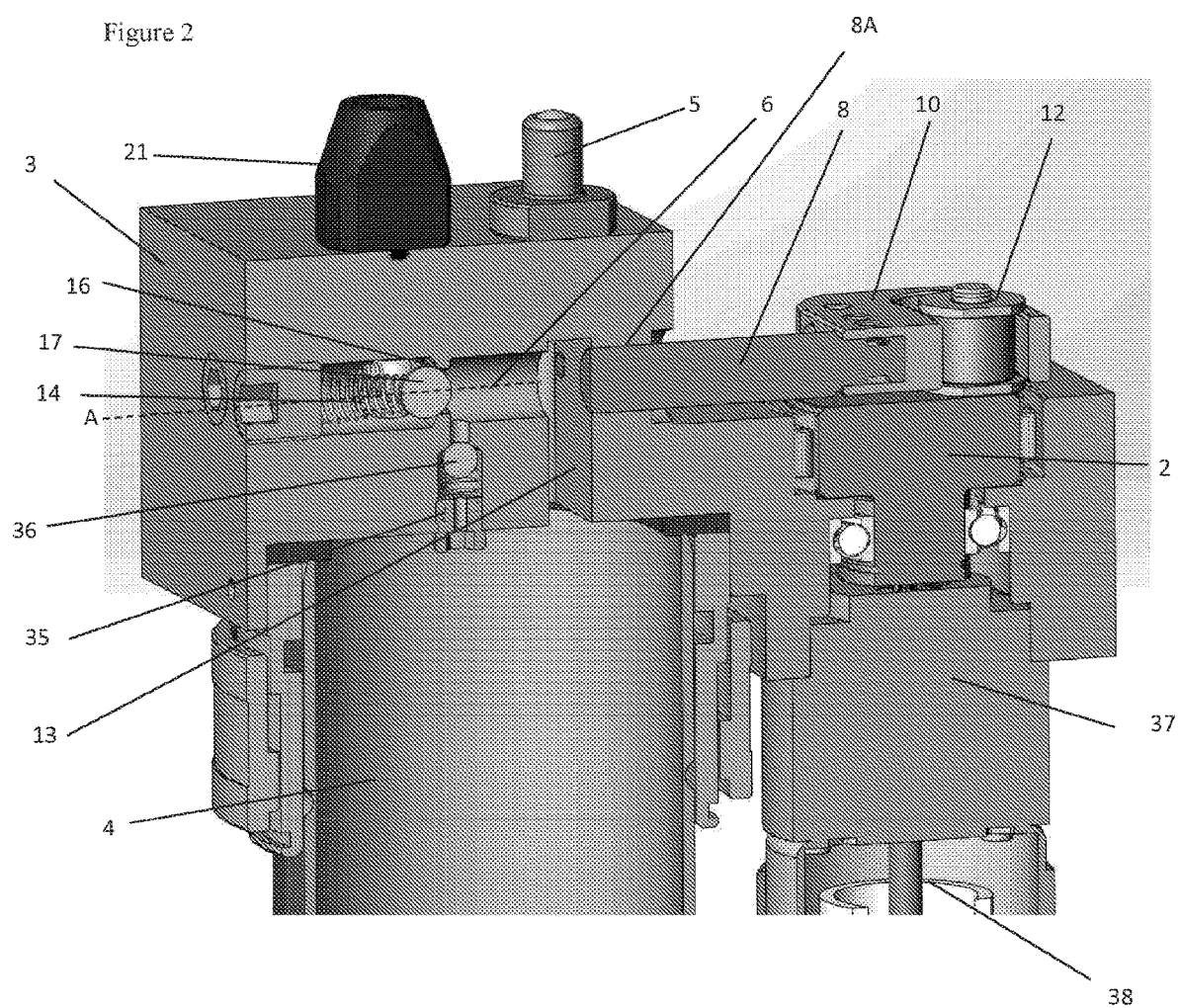
FIG. 2 is a cross section side view of a first embodiment of the grease gun of FIG. 1 where the pistons are in a side-by-side configuration and the high flow/high pressure switch takes the form of a bypass valve, showing the first piston in the retracted position.

Disclosed herein is a battery-operated grease gun 1, as shown in FIG. 1. As is shown in FIG. 2, the grease gun 1 includes an actuator, in the form of a crank wheel 2, and a body 3. In use, body 3 is connected to a container, in the form of a grease barrel 4. The grease barrel 4 is designed for filling through standard grease cartridges or bulk filled from a grease source. When grease barrel 4 is empty, if using grease cartridges, grease barrel 4 will be uncoupled from body 3 to access and replace the cartridge; if bulk filled instead, when grease barrel 4 is empty, it can be connected to a grease source through filler/bleeder 5 for refilling (see, for example, FIGS. 2 and 4).

Figure 3:
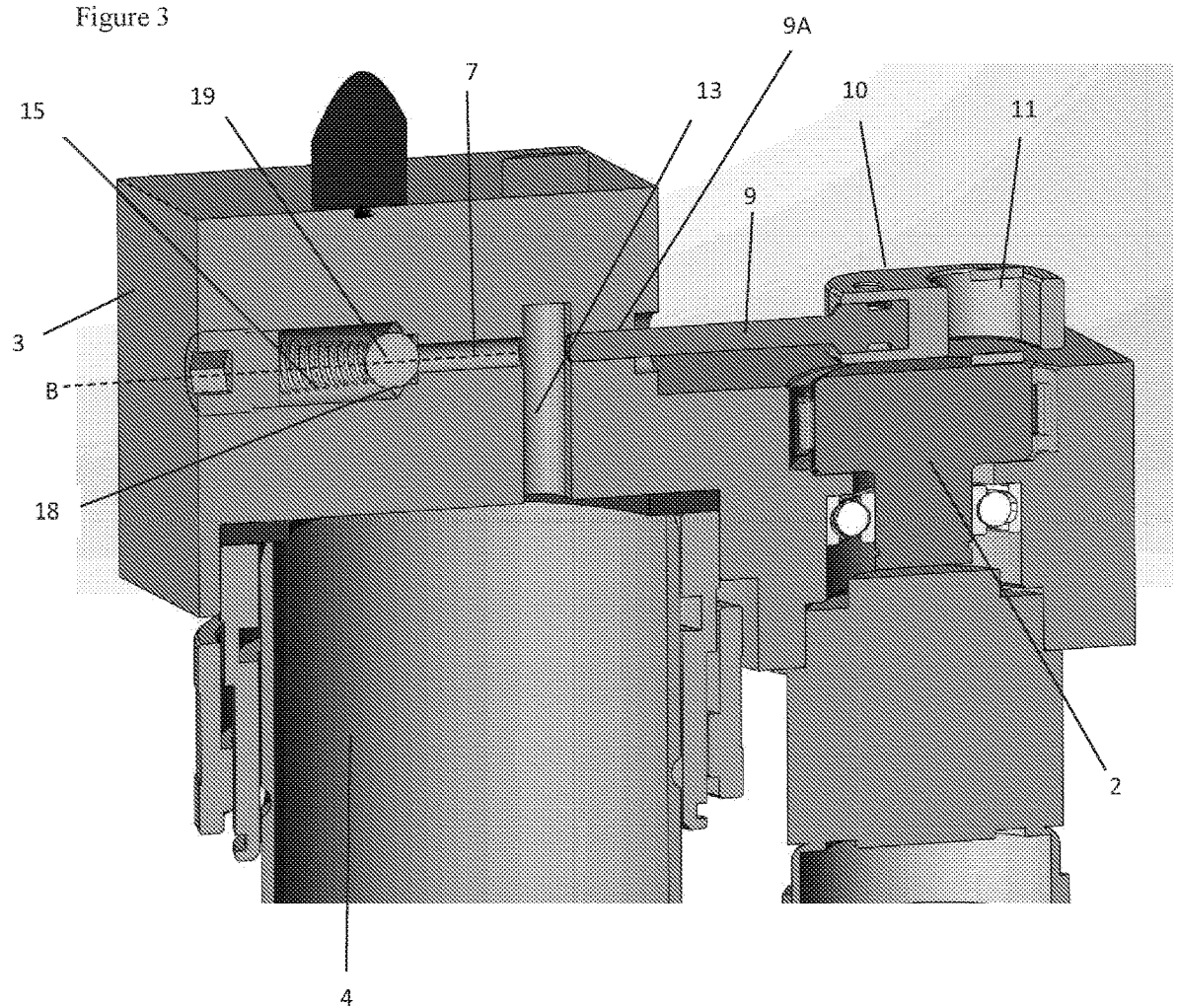
FIG. 3 is a cross section side view of the first embodiment, showing the second piston in the retracted position.

The body 3 includes a first elongate chamber 6 (as shown in FIG. 2) and second elongate chamber 7 (as shown in FIG. 3). Second chamber 7 has a smaller cross-sectional area relative to the cross-sectional area of the first chamber 6 and therefore is configured to hold a smaller volume of grease than first chamber 6. In the detailed embodiment, first chamber 6 and second chamber 7 are circular in cross-section and second chamber 7 is of a smaller diameter to the diameter of the first chamber 6. First chamber 6 extends along a first axis A and second chamber 7 extends along a second axis B, the axes being spaced apart. In the embodiment shown in FIG. 4, first axis A and second axis B are substantially parallel to one another. First piston 8 is moveable within first chamber 6 such that it moves (e.g. translates, reciprocates) along first axis A. Second piston 9 is moveable within second chamber 7 such that it moves (e.g. translates, reciprocates) along second axis B. As will be apparent to the skilled addressee, provided the pistons are still able to be actuated in the same phase by crank wheel 2, in an alternate embodiment (not shown) the axes A and B may not be parallel to one another.

Figure 4:
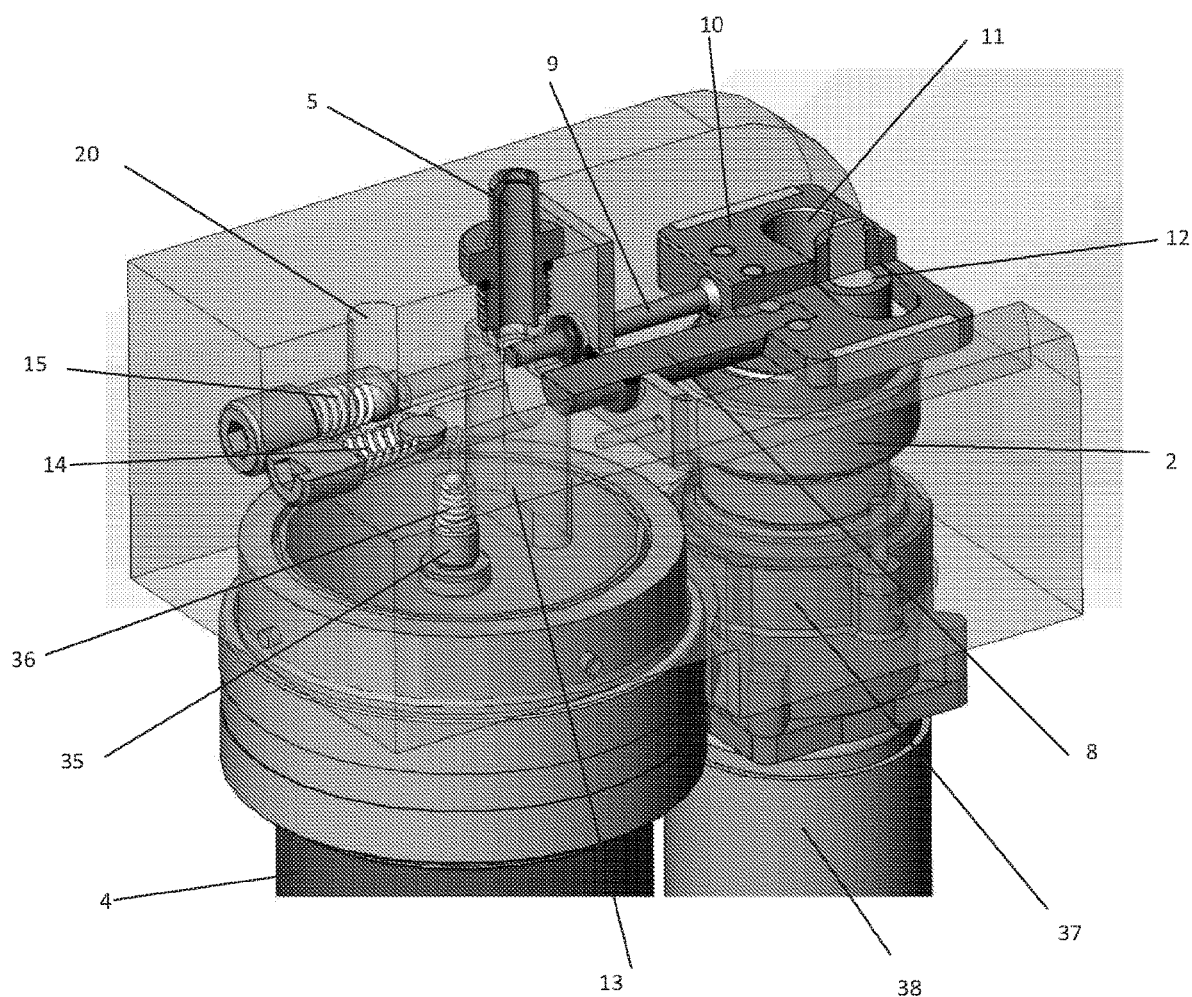
FIG. 4 is a cross section top view of the first embodiment, showing the first and second pistons in the retracted position.
Figure 5:
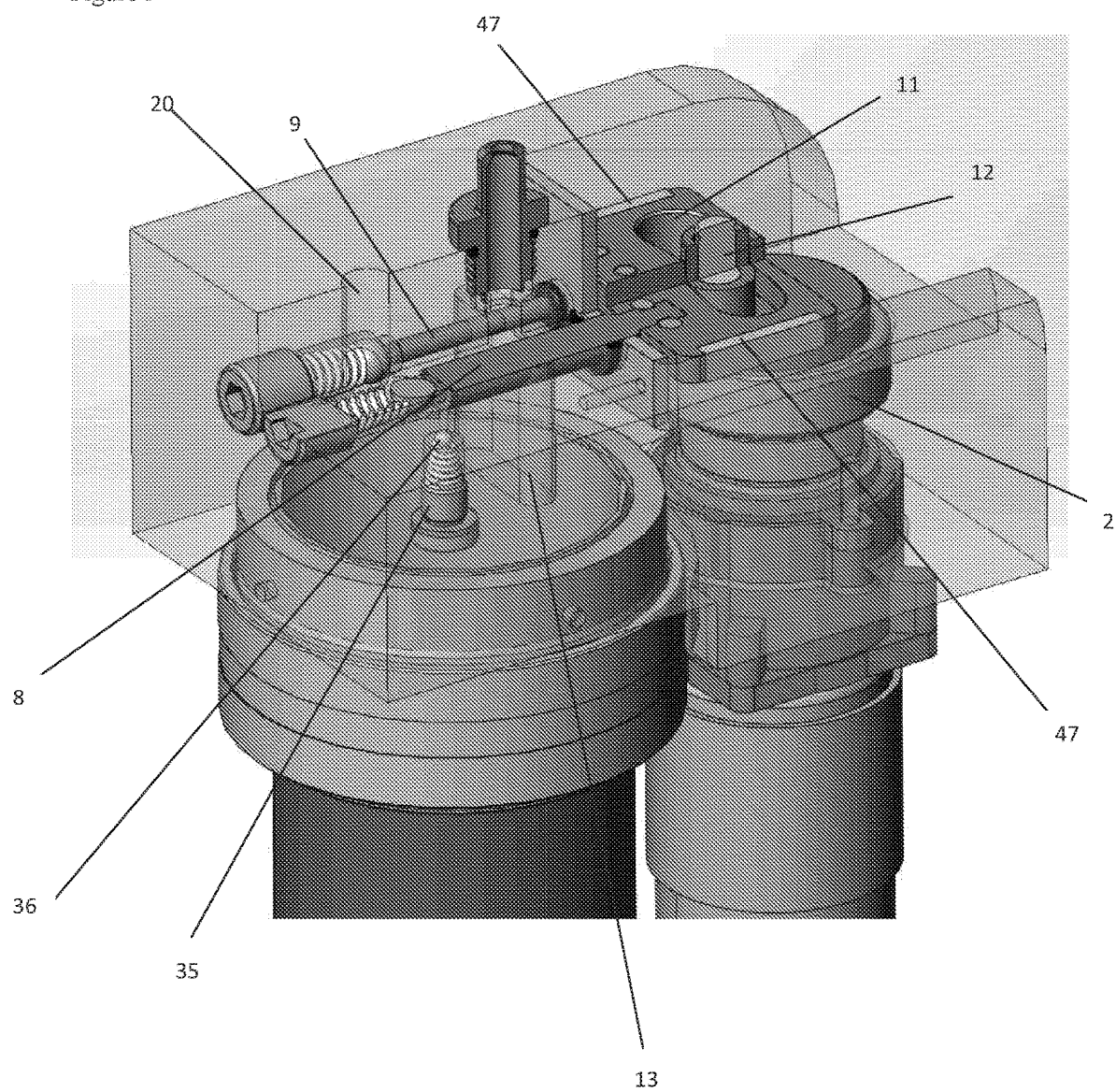
FIG. 5 is a cross section top view of the first embodiment, showing the first and second pistons in the engaged position.
Figure 6:
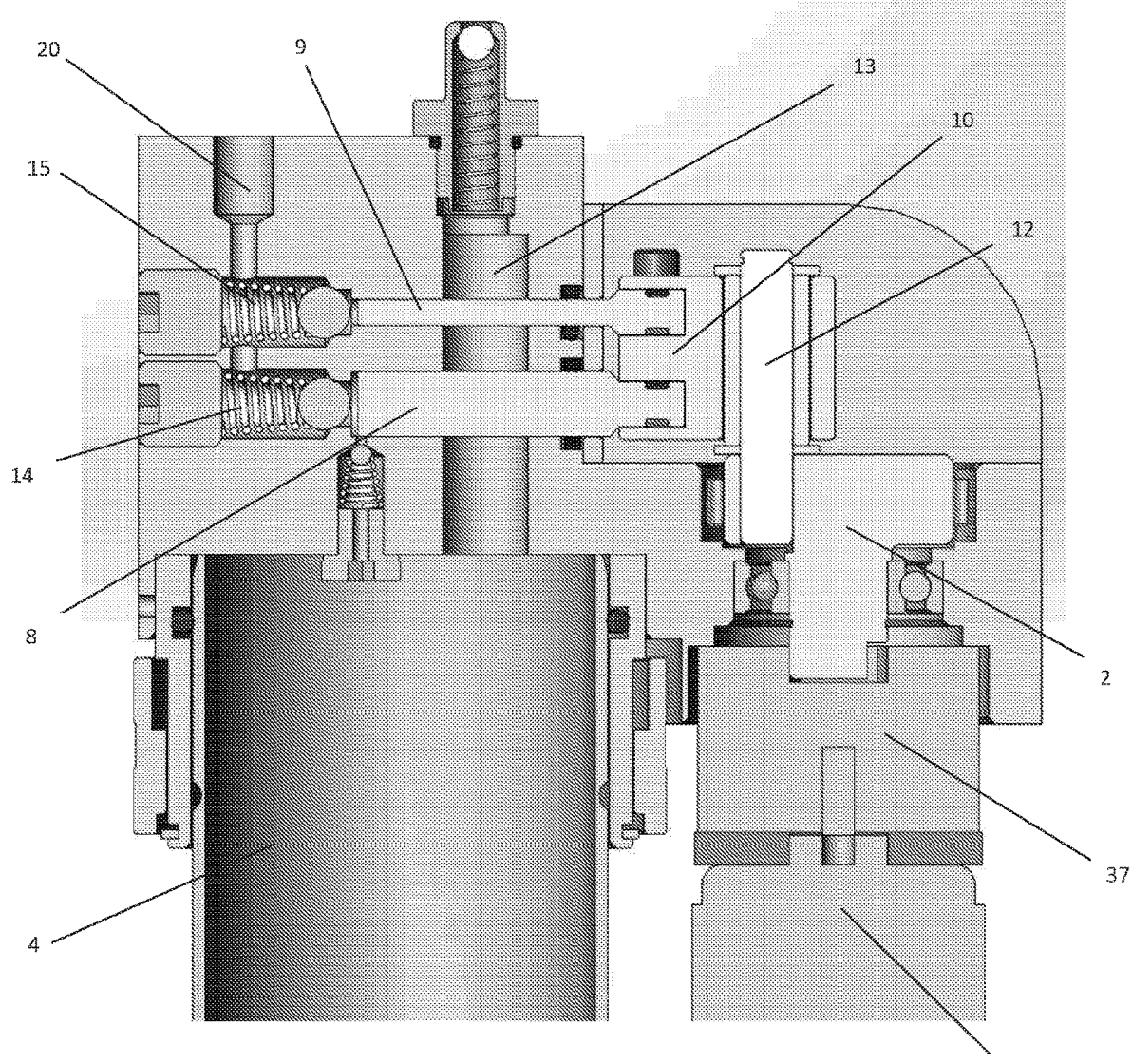
FIG. 6 is a cross section side view of a second embodiment of the grease gun of FIG. 1 where the pistons are in a top-bottom configuration and the high flow/high pressure switch takes the form of a bypass valve, showing the pistons in the engaged position.
Figure 7:
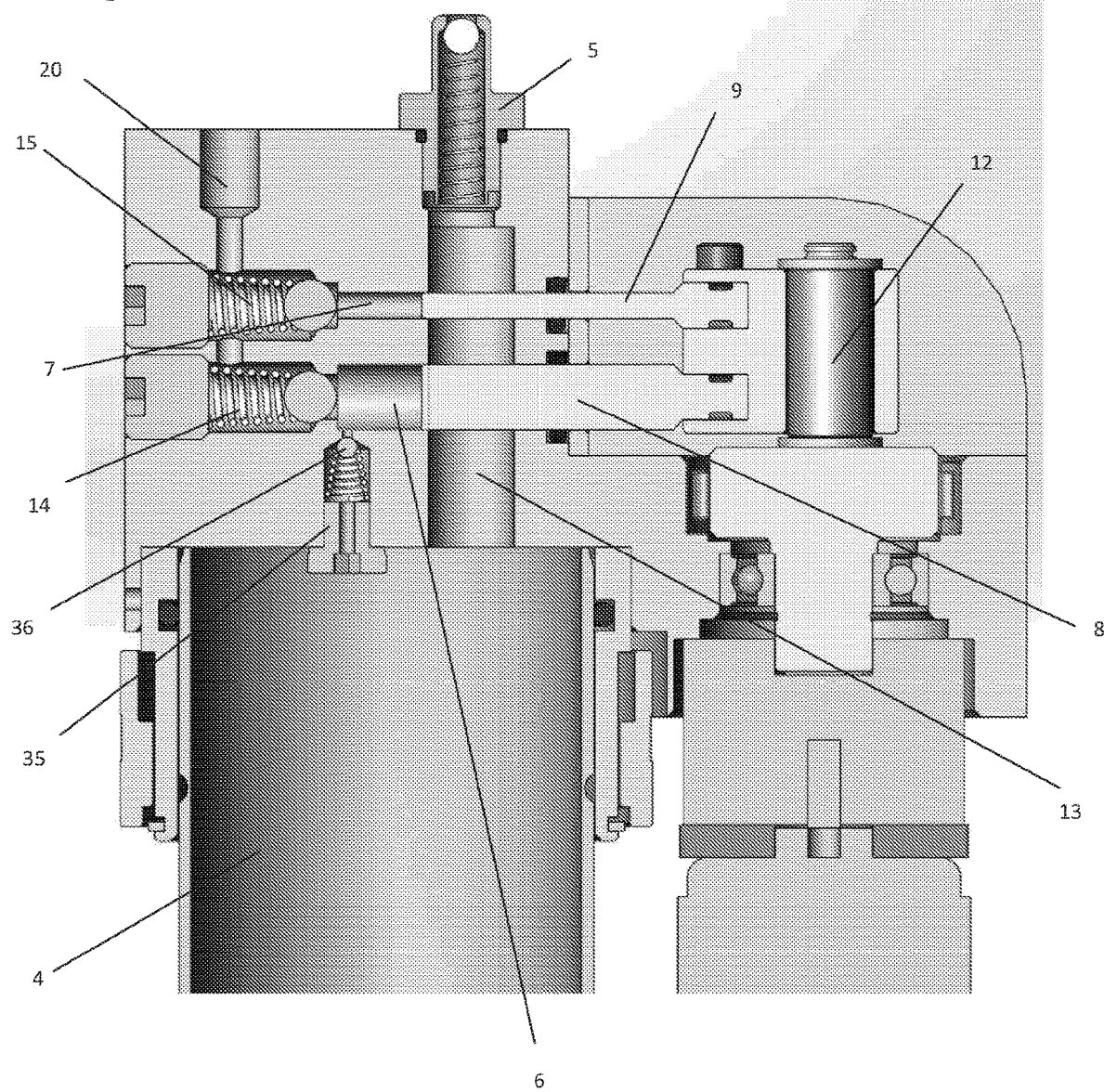
FIG. 7 is a cross section side view of the second embodiment, showing the first and second pistons in a partially engaged position.
Figure 8:
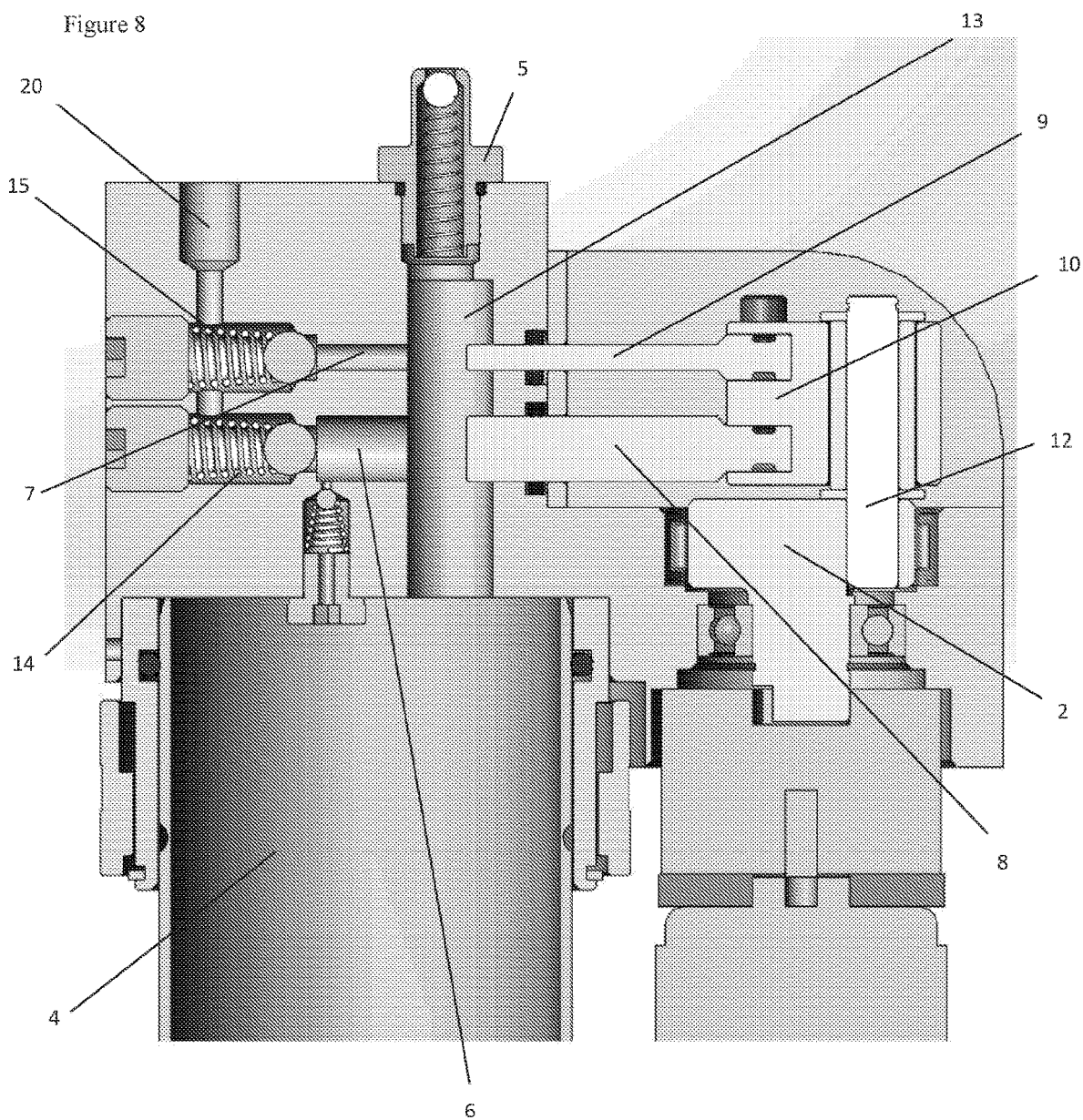
FIG. 8 is a cross section side view of the second embodiment, showing the first and second positions in an retracted position.

First piston 8 and second piston 9 may be located on the same horizontal plane in a side-by-side configuration, as shown in FIGS. 4 and 5, or may be located on the same vertical plane in a top-bottom configuration, as shown in FIGS. 6 to 8. These configurations provide different advantages for the operation of the system. For example, the side-by-side configuration shown in FIGS. 4 and 5 provides more compactness and cost-effectiveness to the design in terms of allowing a smaller gun body. The top-bottom configuration shown in FIGS. 6 to 8 provides, for example, more balance to side-loads on the crank and pistons thereby ensuring better longevity of the mechanism.

First piston 8 and second piston 9 are fixed at one end to link 10. The fixing of first piston 8 and second piston 9 to link 10 holds the pistons in a fixed relationship with respect to one another so that they reciprocate in the same phase. In the position shown in FIGS. 4 and 5, first piston 8 and second piston 9 are fixed in a side-by-side configuration on link 10. In the position shown in FIGS. 6 to 8, first piston 8 is fixed to link 10 below second piston 9. Side guides 47 are arranged on both sides of the link to take side loads and enable the link to discharge purely axial loads on the two pistons. In the detailed embodiment, side guides 47 are made of high wear resistance material.

Link 10 contains an aperture 11. Cam 12 is attached to crank wheel 2. Upon movement of crank wheel 2, cam 12 is caused to rotate in a circular movement along the edge of crank wheel 2. Cam 12 is received within aperture 11. During this movement, cam 12 travels within aperture 11 in a direction substantially perpendicular to first axis A. By means of the movement of cam 12 within aperture 11, the rotational movement of crank wheel 2 is translated into the translational movement of link 10 and consequentially first piston 8 and second piston 9 along first axis A and second axis B, respectively. In this way, first piston 8 and second piston 9 are continually reciprocated by crank wheel 2 from a fully engaged position (as shown in, for example, FIG. 6) to a fully retracted position (as shown in, for example, FIG. 8) via a partially engaged position (as shown in, for example FIG. 7). The engaged, or extended, position of the crank wheel 2 corresponds with an extended position for the first and second pistons. The retracted, or disengaged, position of the crank wheel 2 corresponds with a retracted position for the first and second pistons. The partially engaged, or partially extended, position of the crank wheel 2 corresponds with a partially extended position for the first and second pistons (e.g. the pistons are part way through a translation in one direction or the other).

The movement of crank wheel 2 is driven by motor 37. Motor 37 could be, for example an electric 18 VDC motor, a 12 VDC motor, a 21 VDC motor or a 24 VDC motor. As will be apparent to the skilled addressee, other motors may be suitable. Motor 37 is powered by battery 38. The battery may be, for example, a lithium-ion battery, a nickel-metal hydride battery or a nickel-cadmium battery. Preferably, the battery is rechargeable. As will be apparent to the skilled addressee, other batteries may be suitable.

First chamber 6 and second chamber 7 are fluidically connected with each other, and with grease barrel 4 via common grease channel 13. When first piston 8 and second piston 9 are in the retracted position, they are located in such a position within first chamber 6 and second chamber 7, respectively, that they do not block the flow of grease from grease barrel 4 into first chamber 6 and second chamber 7 via common grease channel 13. As first piston 8 and second piston 9 move from the retracted position to the intermediate position, they advance within first chamber 6 along first axis A and within second chamber 7 along second axis B, respectively, progressively obstructing and eventually closing common grease channel 13.

In the top-bottom configuration shown in FIGS. 6 to 8, common grease channel 13 is situated under the two pistons with its centre on the same vertical plane. In this way, grease from grease barrel 4 will reach and feed first chamber 6 before second chamber 7. In the side-by-side configuration shown in FIGS. 2 to 5, common grease channel 13 is situated symmetrically under the two pistons such that grease from grease barrel 4 reaches and feeds first chamber 6 and second chamber 7 simultaneously.

First piston 8 is fitted with positive seal 8A to form a liquid-tight engagement with first chamber 6. Second piston 9 is fitted with positive seal 9A to form a liquid-tight engagement with second chamber 7. In some forms, these positive seals are in the form of an O-ring, although they may take other forms such as, for example, an O-ring with a backup ring, an X-ring, a rod seal, a lip seal, etc.

As is shown in FIGS. 2 and 3, body 3 includes a third chamber 14 and a fourth chamber 15. The third chamber 14 is fluidically connected to first chamber 6 via a first grease channel 16. First grease channel 16 includes a non-return valve, shown in the detailed embodiment as a spring loaded non-return valve 17. By default, non-return valve 17 is closed and it is only opened if the grease in first chamber 6 exerts enough pressure on non-return valve 17 to overcome the biasing force of the spring. As first piston 8 moves further within first chamber 6 along first axis A and the pressure on the grease within first chamber 6 increases as a result of the decreasing volume, non-return valve 17 is opened and grease can pass from first chamber 6 into third chamber 14. Non-return valve 17 permits the flow of grease from first chamber 6 through first grease channel 16 into third chamber 14 but restricts the flow of grease from third chamber 14 back into first chamber 6. In the detailed embodiment, non-return valve 17 prevents the flow of grease from third chamber 14 back into first chamber 6.

Fourth chamber 15 is fluidically connected to second chamber 7 by way of second grease channel 18. Second grease channel 18 includes a non-return valve, shown in the detailed embodiment as a spring loaded non-return valve 19. $B_Y$ default, non-return valve 19 is closed and it is only opened if the grease in second chamber 7 exerts enough pressure on non-return valve 19 to overcome the biasing force of the spring. As second piston 9 moves further within second chamber 7 along second axis B and the pressure on the grease within second chamber 7 increases as a result of the decreasing volume, non-return valve 19 is opened and grease can pass from second chamber 7 into fourth chamber 15. Non-return valve 19 permits the flow of grease from second chamber 7 through second grease channel 18 into fourth chamber 15 but restricts the flow of grease from fourth chamber 15 back into second chamber 7. In the detailed embodiment, non-return valve 19 prevents the flow of grease from fourth chamber 15 back into second chamber 7.

The third chamber 14 is located at the end of first chamber 6 away from first piston 8. In the detailed embodiment, third chamber 14 is located along first axis A.

The fourth chamber 15 is located at the end of second chamber 7 away from second piston 9. In the detailed embodiment, fourth chamber 15 is located along second axis B.

In use, grease will flow into first chamber 6 and second chamber 7 via common grease channel 13. As first piston 8 and second piston 9 advance within first chamber 6 and second chamber 7, respectively, the pressure within first chamber 6 and second chamber 7 will increase. When the pressure in the first and second chambers is greater than the pressure on non-return values 17 and 19, the non-return valves will open and grease will flow from first chamber 6 into third chamber 14 and from second chamber 7 into fourth chamber 15. Each time the pistons advance, more grease will flow into third chamber 14 and fourth chamber 15, and the pressure within those chambers will increase. Third chamber 14 and fourth chamber 15 are each fluidically connected to outlet chamber 20. In the top-bottom configuration, outlet chamber 20 extends through fourth chamber 15 into third chamber 14. In the side-by-side configuration, outlet chamber 20 is situated above, and connected to, third chamber 14 and second chamber 15. The fluidic connection between third chamber 14 and fourth chamber 15 allows grease in third chamber 14 and fourth chamber 15 to flow into outlet chamber 20 and out of grease gun 1 by way of grease outlet 21. That grease can then be applied to the relevant area of a vehicle, or other machinery or similar, that requires lubrication at a specific location. Preferably, the grease outlet will be connected to a grease tube with a Zerc fitting on the end that enables the grease gun to be fluidically connected to the vehicle or other machinery.

High Flow/High Pressure Switch

In the detailed embodiment, body 3 includes a means for automatically switching grease gun 1 between a high flow mode and a high pressure mode. In high flow mode, the grease gun provides a maximum output of grease. Due to the limitations of batteries suitable for use with a battery operated grease gun, the grease in high flow mode is only able to be provided at a relatively low pressure. When there is a blockage in the flow of grease into the vehicle or similar, the pressure in high flow mode may be unable to clear this blockage. In this situation, the grease gun is able to automatically switch to a high pressure mode. In high pressure mode, the amount of grease flowing through grease outlet 21 is less than the amount of grease flowing through grease outlet in high flow made, but the pressure of that grease will be higher, providing more pressure to clear the blockage.

The grease gun disclosed herein contemplates three different high flow/high pressure switches, which will be described below in turn.

Pressure Driven Spool

FIGS. 9 to 14 illustrate a first aspect of the high pressure/high flow switch of the present disclosure, wherein the high pressure/high flow switch is by way of a pressure driven spool. This form of the high pressure/high flow switch can be used in both the side-by-side and top-bottom configurations of grease gun 1.

As shown in FIGS. 9 to 14, the body 3 of grease gun 1 further contains spool channel 22 which extends along a third axis C. Spool channel 22 is boundaried by walls 23. In FIGS. 9 to 14, third axis C is parallel to first axis A and second axis B, although there is no requirement that it be parallel to these axes. Third axis C could form any angle to first axis A and second axis B between parallel and perpendicular. Moveable within spool channel 22 is spool 24. Spool 24 is configured to move (e.g. translate) between open position and a closed position.

At a first end 22A of spool channel 22 is pressure channel 25 which is in fluidic communication with third chamber 14. When there is grease within third chamber 14, a portion of the grease will pass along pressure channel 25.

Figure 11:
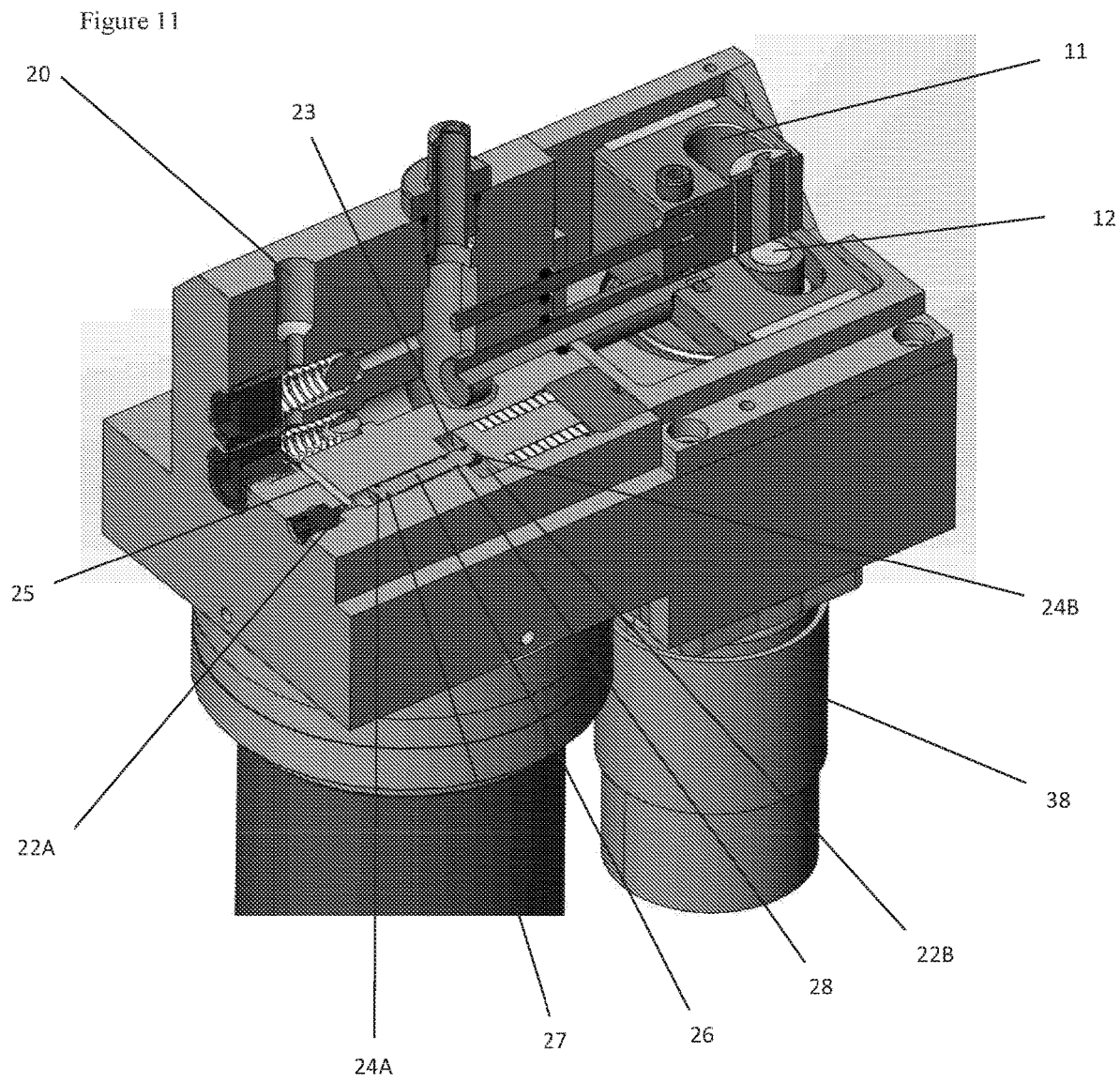
FIG. 11 is a cross section top view of the third embodiment, showing the first and second pistons in the retracted position and the spool in the open position.

Spool 24 has a mid-section 26, which is boundaried by first annular ring 27 and second annular ring 28 (see FIG. 11). Mid-section 26 has a smaller diameter relatively to the diameter of spool channel 22, the diameter of first annular ring 27 and the diameter of the second annular ring 28. First annular ring 27 and second annular ring 28 are fitted with high pressure seals and form a liquid-tight engagement with surrounding walls 23 of spool channel 22 such that grease is prevented from passing from pressure channel 25 into mid-section 26 by first annular ring 27 and grease is prevented from passing out of mid-section 26 by first annular ring 27 and second annular ring 28. The area between mid-section 26, first annular ring 27, second annular ring 28 and walls 23 forms a communication channel 29.

Figure 9:
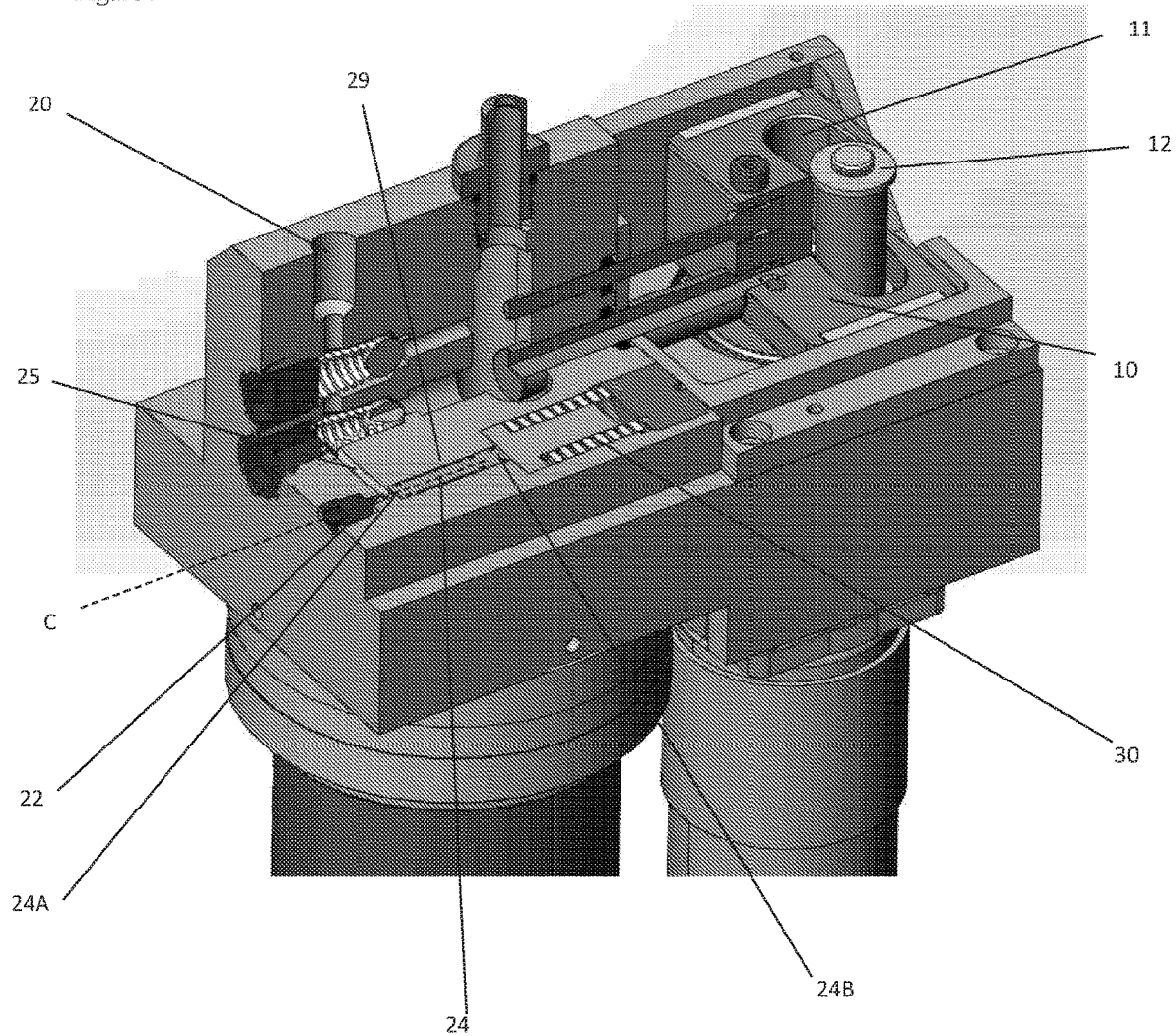
FIG. 9 is a cross section top view of a third embodiment of the grease gun of FIG. 1 where the pistons are in a top-bottom configuration and the high flow/high pressure switch takes the form of a pressure driven spool, showing the first and second pistons in the retracted position and the spool in the closed position.
Figure 10:
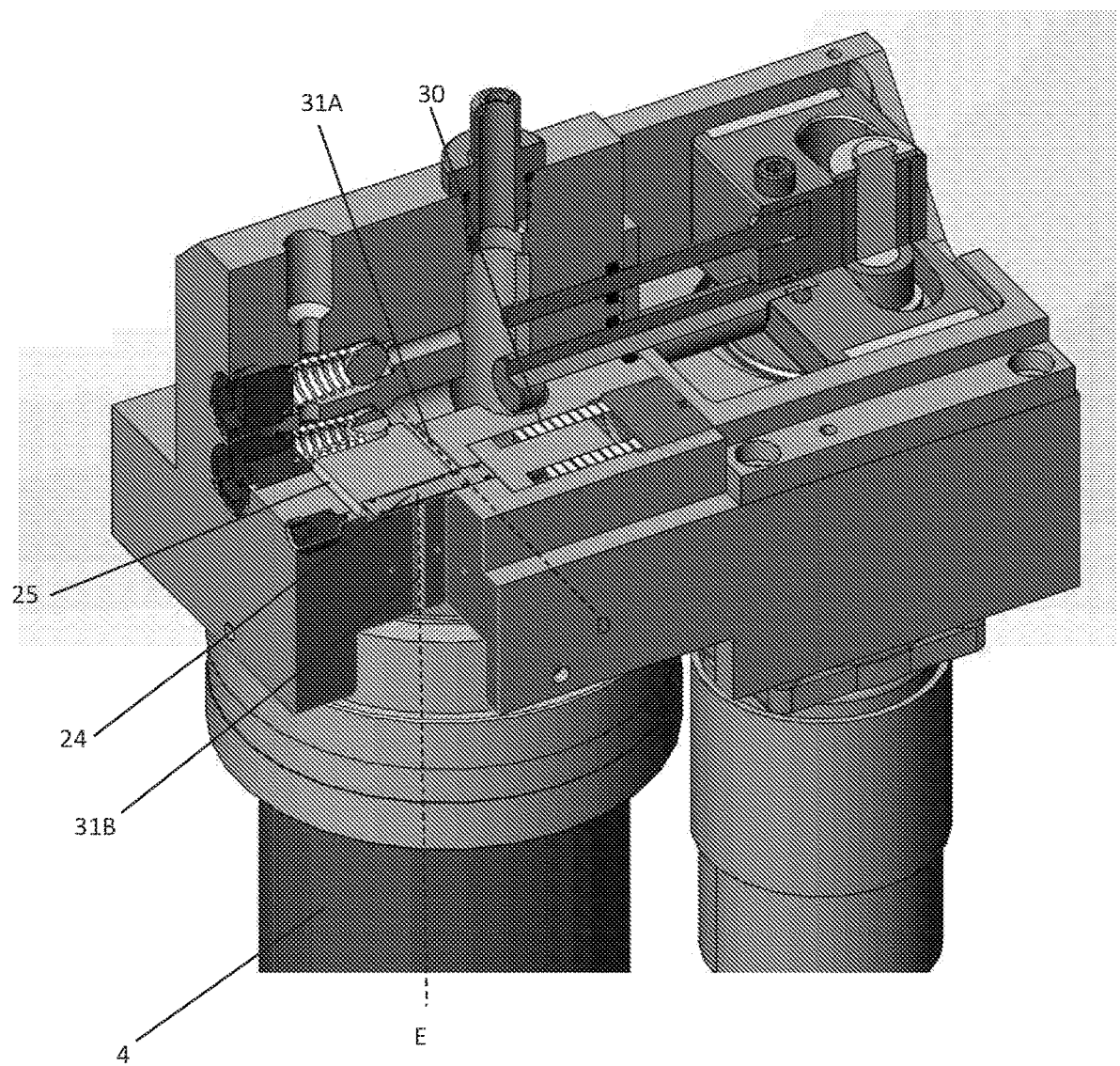
FIG. 10 is a cross section side view of the third embodiment showing the spool in the closed position.
Figure 12:
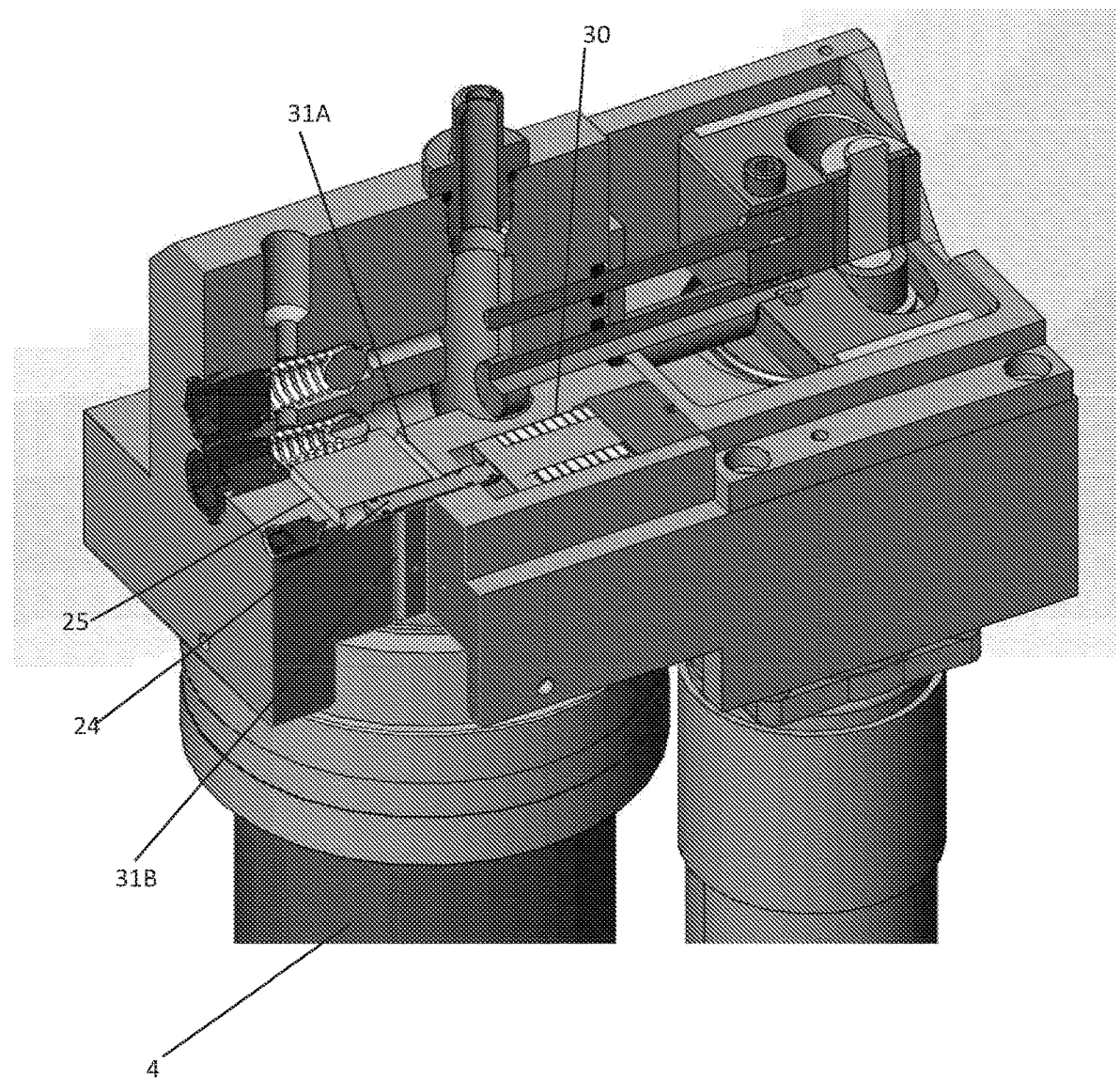
FIG. 12 is a cross section side view of the third embodiment showing the spool in the open position.

Regardless of whether spool 24 is in the open position (as shown in FIGS. 11 and 12) or the closed position (as shown in FIGS. 9 and 10), a first end 24A of spool 24 will be offset from the first end 22A of spool channel 22 so that grease from pressure channel 25 will flow into the portion of spool channel 22 adjacent the first end 24A of spool 24.

At a second end 22B of spool channel 22 is a biasing means, shown in the form of a biasing spring 30, although other biasing means are also contemplated. Biasing spring 30 is adjacent to second end 24B of spool 24 and biases spool 24 towards the closed position.

Between first chamber 6 and grease barrel 4 is bypass channel 31, which is made up of primary bypass channel 31A and secondary bypass channel 31B. Primary bypass channel 31A runs between first chamber 6 and spool channel 22 such that when there is grease in first chamber 6, it will flow through primary bypass channel 31A into communication channel 29. Secondary bypass channel 31B runs between spool channel 22 and grease barrel 4. In the detailed embodiment, primary bypass channel axis D and secondary bypass channel axis E are substantially perpendicular to each other and offset from one other with respect to spool channel 22. When grease gun 1 is in an upright position, primary bypass channel axis D will be a horizontal axis and secondary bypass channel axis E will be a vertical axis. The section of spool channel 22 that connects to primary bypass channel 31A is spaced apart (e.g. offset) from the second of spool channel 22 that connects to secondary bypass channel 31B. Therefore, any grease from primary bypass channel 31A that passes into spool channel 22 must pass along at least a portion of the length of spool channel 22 before passing into secondary bypass channel 31B.

As shown in FIG. 10, when spool 24 is in the closed position, communication channel 29 is not located adjacent to secondary bypass channel 31B. This means that communication channel 29 is spaced from, and therefore not in fluid communication with secondary bypass channel 31B. As a result, in the closed position, any grease in communication channel 29 will not pass into secondary bypass channel 31B.

As shown in FIG. 12, when spool 24 is in the open position, communication channel 29 is located adjacent secondary bypass channel 31B. This means that it is in fluid communication with secondary bypass channel 31B and any grease in communication channel 29 will pass into secondary bypass channel 31B and then into grease barrel 4.

Figure 13:
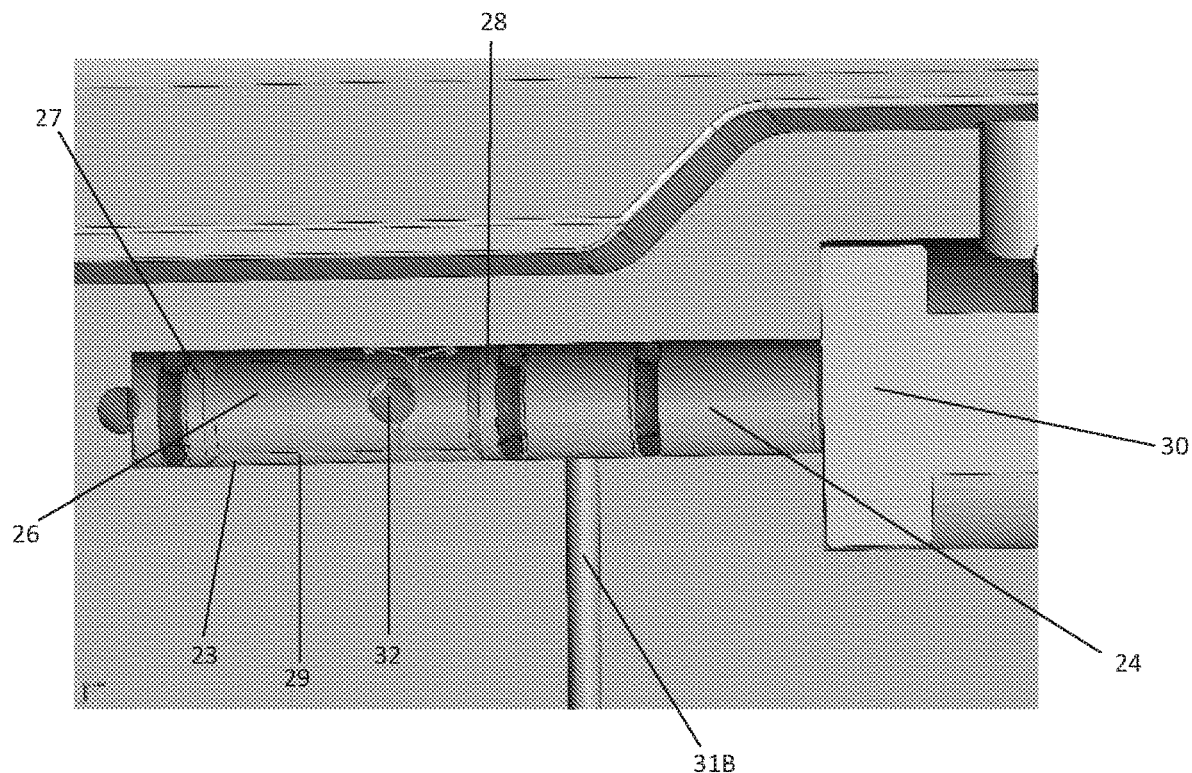
FIG. 13 is a cross section side view of the spool of the third embodiment showing the spool in the closed position.
Figure 14:
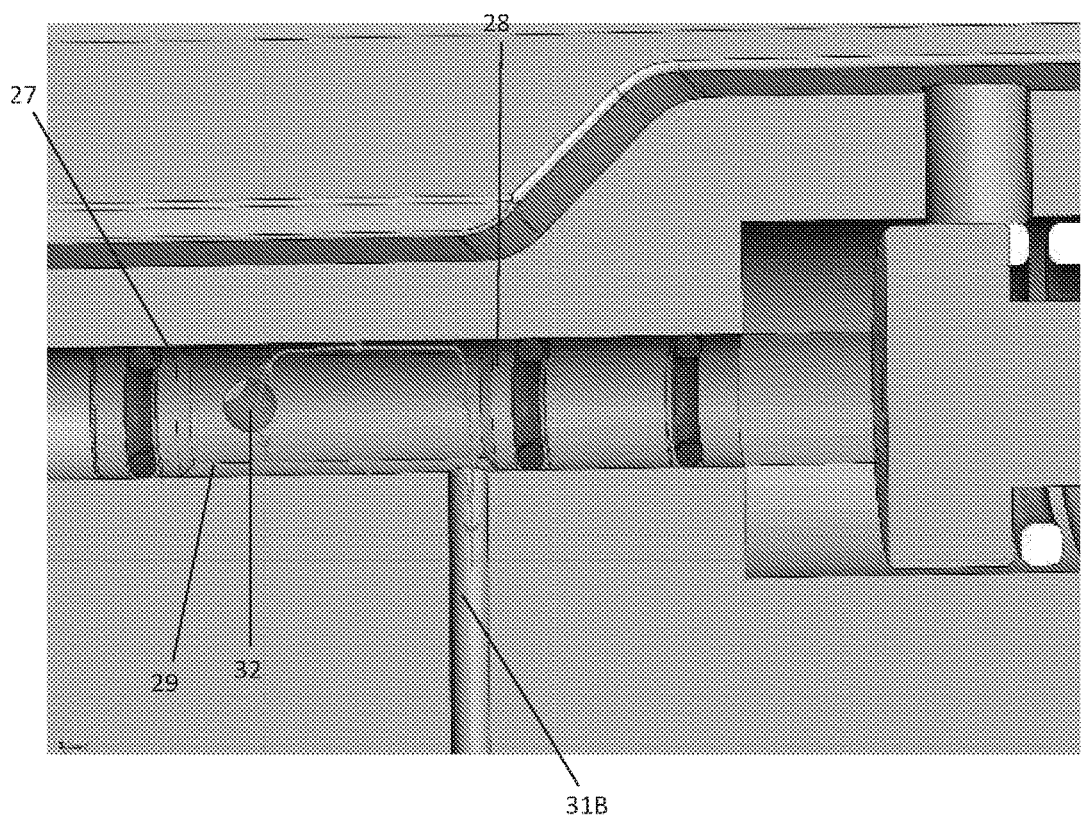
FIG. 14 is a cross section side view of the spool of the third embodiment showing the spool in the open position.

Mid-section 26 may also contain cavity 32. As shown in FIGS. 13 and 14, grease will flow from primary bypass channel 31A through cavity 32 into communication channel 29. In a preferred embodiment, cavity 32 will extend through mid-section 26 in the same orientation as primary bypass channel 31A and substantially perpendicular to the orientation of secondary bypass channel 31B. As shown in FIGS. 10 and 13, when spool 24 is in the closed position, although grease can flow along primary bypass channel 31A through cavity 32 into communication channel 29, it will be prevented by secondary annular ring 28 from passing into secondary bypass channel 31B.

As set out above, biasing spring 30 biases spool 24 towards the closed position. If there is a blocked greasing point, the grease pressure in outlet chamber 20 will increase with each rotation of crank wheel 2. Due to non-return valve 17, the grease from third chamber 14 is restricted from returning to first chamber 6. However, it is not restricted from passing along pressure channel 25 into spool channel 22. In this way, the grease located between first end 22A of spool channel 22 and first end 24A of spool 24 will be under increased pressure. At a pre-determined level of pressure (for example, a level set to an amount between 1000 psi and 3000 psi, preferably between 1500 psi and 2500 psi, most preferably 2000 psi) the force from this pressure will be greater than the force exerted by biasing spring 30, resulting in spool 24 being moved against biasing spring 30 from the closed position to the open position. The pressure from the grease in outlet chamber 20 will keep spool 24 in the open position while grease outlet 21 remains blocked.

When spool 24 is in the closed position, the grease gun is considered to be operating in a "high flow mode". In the high flow mode, all grease contained in first chamber 6 is directed to third chamber 14, for passage into outlet channel 20 and then grease outlet 21. In this mode, first piston 8 and second piston 9 experience the same back pressure and the actuation of link 10 by battery 38 requires enough force to advance the two pistons against the back pressure.

When spool 24 is in the open position, the grease gun is considered to be operating in a "high pressure mode". In high pressure mode, primary bypass channel 31A and secondary bypass channel 31B are connected by way of communication channel 29 and a relatively substantial quantity of the grease that enters first chamber 6 through common grease channel 13 will flow back out of first chamber 6 by way of bypass channel 31 back into grease barrel 4. This quantity varies depending on a number of parameters including backpressure level in the chamber, grease viscosity, temperature, etc.

When bypass channel 31 is in open position, grease in first chamber 6 will follow the path of least resistance through bypass channel 31 back into grease barrel 4. However, an amount of backpressure will still be created in first chamber 6 while first piston 8 advances due to the smaller size of the exit channel out of first chamber 6 (bypass channel 31) compared with the size of the entry channel into first chamber 6 (common grease channel 13). Depending on the backpressure level into first chamber 6, and whether it is sufficient to open non-return valve 17, some or none of the grease in first chamber 6 will pass through non-return valve 17 into third chamber 14. As at least the majority of the grease from first chamber 6 will flow through bypass chamber 31, the battery only requires the force to advance the second piston 9 against the backpressure in second chamber 7, as the backpressure on first piston 8 in first chamber 6 will be minimal. This reduces the power required from battery 38 due to the relatively smaller force required to advance second piston 9, compared to the force to advance both first piston 8 and second piston 9 together, particularly where there is increased pressure in the system due to a grease blockage. The additional pressure able to be provided to second chamber 7 when the grease gun is in high pressure mode can increase the pressure of the grease out of grease outlet 21 to very high levels (for example, up to 10,000 psi), which may remove the blockage in the system.

Once the blockage is cleared, the pressure in outlet channel 20 and grease outlet 21 will be reduced, which will reduce the pressure in pressure channel 25, resulting in a reduction in the pressure on first end 24A of spool 24. Once the pressure is reduced such that the force on first end 24A is less than the force on 24B from biasing spring 30, biasing spring 30 will push spool 24 to the closed position.

Pressure Relief Bypass Valve

FIGS. 2 to 8 illustrate a second aspect of the high pressure/high flow switch of the present disclosure, wherein the high pressure/high flow switch is by way of a pressure relief bypass valve. This form of the high pressure/high flow switch can be used in both the side-by-side and top-bottom configurations of grease gun 1.

In this second aspect, body 3 further comprises secondary grease channel 35. Secondary grease channel 35 runs between, and fluidically connects, first chamber 6 and grease barrel 4. It is located forward of common grease channel 13 towards the engaged position of first piston 8. Secondary grease channel 35 contains a non-return valve, preferably a spring loaded non-return valve 36 which operates as a hydraulic switching mechanism. When non-return valve 36 is open, it permits the flow of grease through secondary grease channel 35 from first chamber 6 into grease barrel 4 but restricts the flow of grease through secondary grease channel 35 from grease barrel 4 into first chamber 6. By default, non-return valve 36 is closed and it is only opened if the grease in first chamber 6 gets to a certain predetermined level of pressure that exceeds the biasing force from the spring of non-return valve 36.

When non-return valve 36 is open, the grease gun switches from a high flow mode to a high pressure mode. Because non-return valve 36 is open, most of the grease that enters first chamber 6 through common grease channel 13 will flow back into grease barrel 4 by way of secondary grease channel 35. The amount of grease that will flow back into grease barrel 4 will depend on a number of factors including line backpressure of the system, and the viscosity of the grease. In the high pressure mode, non-return valve 36 opens and shuts at every reciprocation of first piston 8, in response to the pressure generated by the piston itself in first chamber 36.

As at least the majority of the grease from first chamber 6 will flow through secondary grease channel 35, battery 38 only requires the force to advance the second piston 9 against the backpressure in second chamber 7, as the backpressure on first piston 8 in first chamber 6 will be minimal. This reduces the power required from battery 38 to power motor 37 and therefore rotate crank wheel 2 due to the relatively smaller force required to advance second piston 9, compared to the force to advance both first piston 8 and second piston 9 together, particularly where there is increased pressure in the system due to a grease blockage. The additional pressure able to be provided to second chamber 7 when the grease gun is in high pressure mode can increase the pressure of the grease out of grease outlet 21 to very high levels (for example, up to and beyond 10,000 psi), which will help remove the blockage in the system.

Once the blockage is cleared, the pressure in outlet channel 20 and grease outlet 21 will be reduced, which will reduce the pressure in third chamber 14, resulting in a reduction in the pressure in first chamber 6. Once the pressure is reduced below the pre-determined level, non-return valve 36 will be closed and all grease from first chamber 6 will pass into third chamber 14.

Gap Based Bypass

Figure 15:
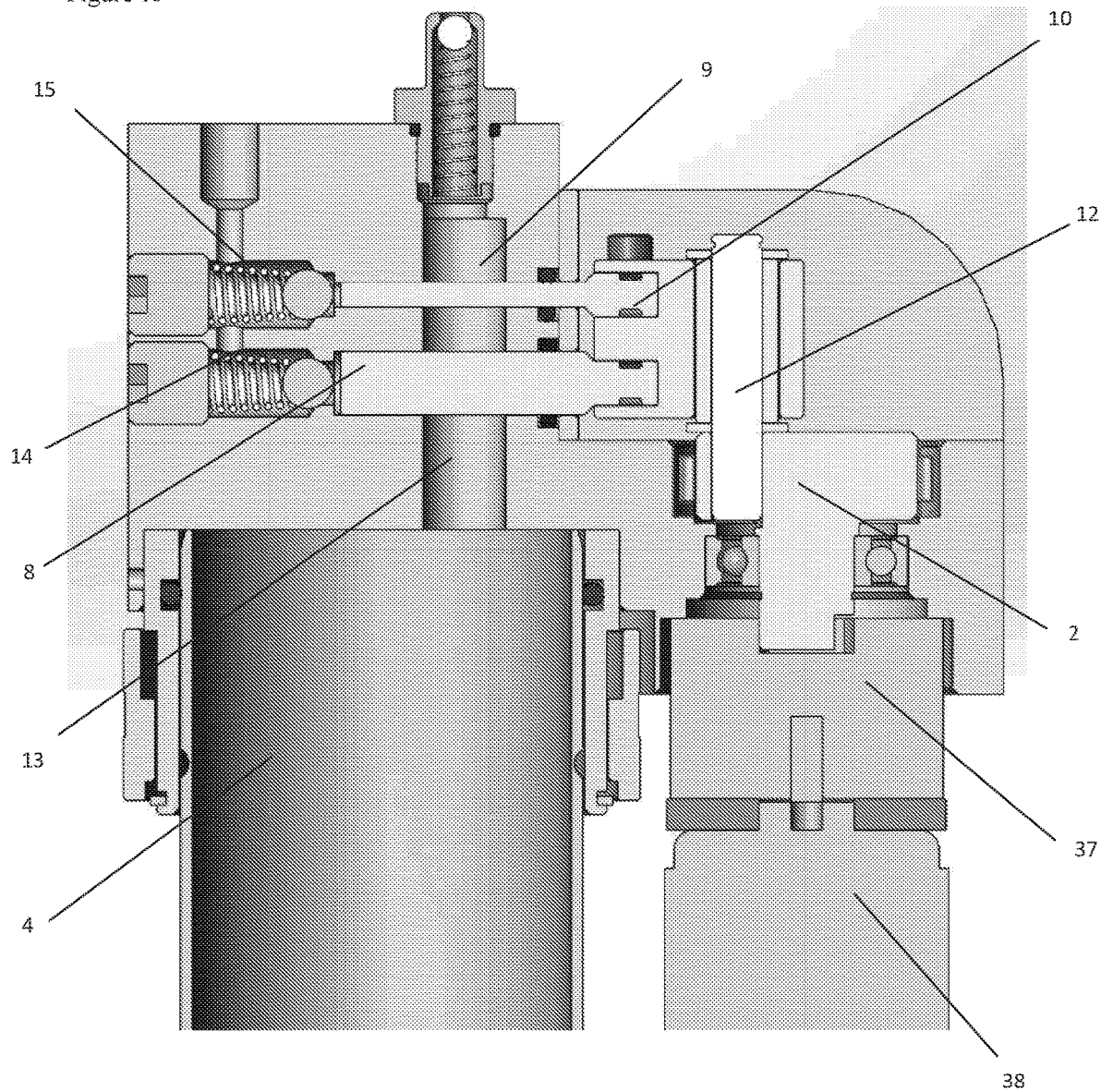
FIG. 15 is cross section side view of a fourth embodiment of the grease gun of FIG. 1 where the pistons are in a top-bottom configuration and the high flow/high pressure switch takes the form of a gap based bypass, showing the first and second pistons in the engaged position.
Figure 16:
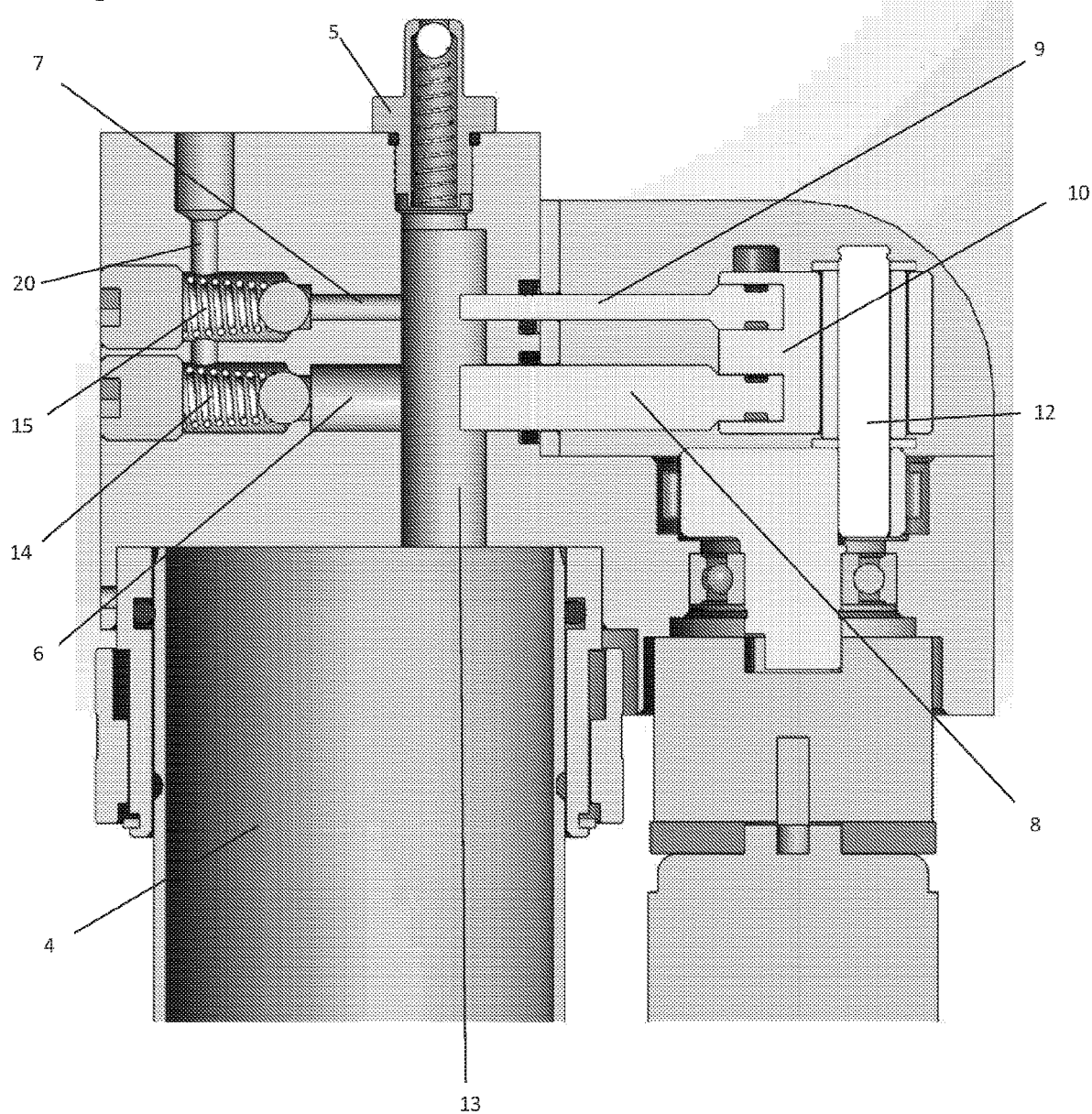
FIG. 16 is a cross section side view of the fourth embodiment showing the first and second pistons in the retracted position.
Figure 17:
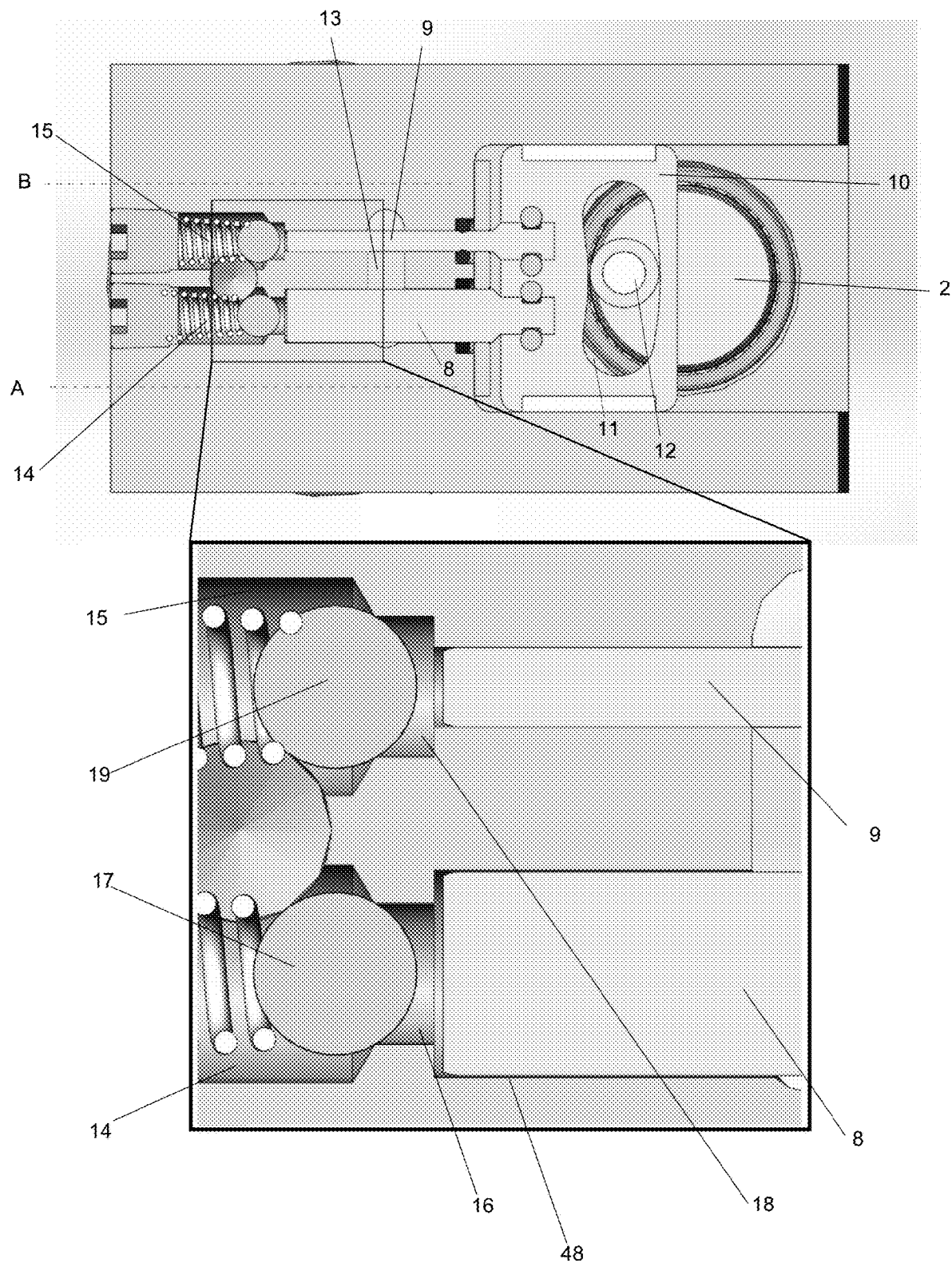
FIG. 17 is a cross section top view and detail view of a fifth embodiment of the grease gun of FIG. 1 where the pistons are in a side-by-side configuration and the high flow/high pressure switch takes the form of a gap based bypass, showing the first and second pistons in the engaged position.
Figure 18:
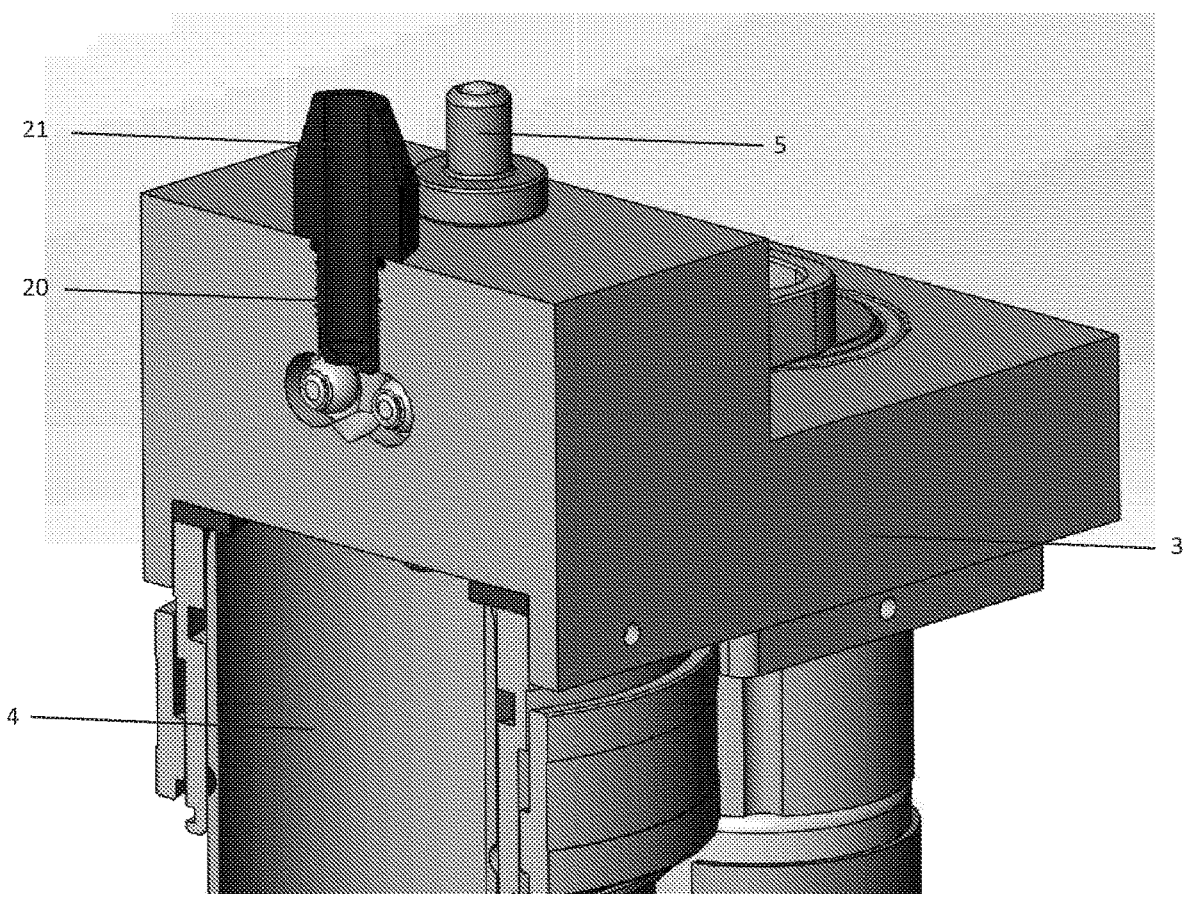
FIG. 18 is a cross section side view of the grease gun of FIG. 1.

FIGS. 15 to 17 illustrate a third aspect of the high pressure/high flow switch of the present disclosure, wherein the high pressure/high flow switch is by way of a gap based bypass. This form of the high pressure/high flow switch can be used in both the side-by-side and top-bottom configurations of grease gun 1.

In the grease gun outlined above, there is a liquid-tight engagement between first chamber 6 and first piston 8, and between second chamber 7 and second piston 9 such that grease is prevented from travelling back alone the respective chamber when the respective piston is advanced within that chamber. For example, this can be done by the use of positive seal 8A on first piston 8 and positive seal 9A on second piston. However, in this aspect of the disclosure, it is advantageous to have a space between first piston 8 and first chamber 6 such that grease can pass back along first chamber 6 into common grease channel 16.

The first piston 8 has a smaller diameter than the diameter of first chamber 6 such that a radial gap 48 is formed between first piston 8 and first chamber 6.

When the pressure within first chamber 6 is less than a predetermined amount, the reciprocation of first piston 8 from the retracted position to the engaged position will push grease within first chamber 6 into third chamber 14. However, when the pressure within first chamber 6 is greater than a predetermined amount, the grease gun will be in high pressure mode and the pressure resulting from any further reciprocation of first piston 8 from the retracted position to the engaged position will force any grease along radial gap 48 in first chamber 6 into common grease channel 13.

In the detailed form, there is no corresponding gap between second piston 9 and second chamber 7.

As the majority of the grease from first chamber 6 will flow along radial gap 48 of first chamber 6 to common grease channel 13, battery 38 only requires the force to advance second piston 9 against the backpressure in second chamber 7, as the backpressure on first piston 8 in first chamber 6 will be minimal. This reduces the power required from battery 38 to power motor 37 and therefore rotate crank wheel 2 due to the relatively smaller force required to advance second piston 9, compared to the force to advance both first piston 8 and second piston 9 together, particularly where there is increased pressure in the system due to a grease blockage. The additional pressure able to be provided to second chamber 7 when the grease gun is in high pressure mode can increase the pressure of the grease out of grease outlet 21 to very high levels (for example, up to and beyond 10,000 psi), which will help remove the blockage in the system.

Once the blockage is cleared, the pressure in outlet channel 20 and grease outlet 21 will be reduced, which will reduce the pressure in third chamber 14, resulting in a reduction in the pressure in first chamber 6. Once the pressure is reduced below the pre-determined level, the pressure will be such that all grease from first chamber 6 will pass into third chamber 14.

Barrel Quick Release

Figure 19:
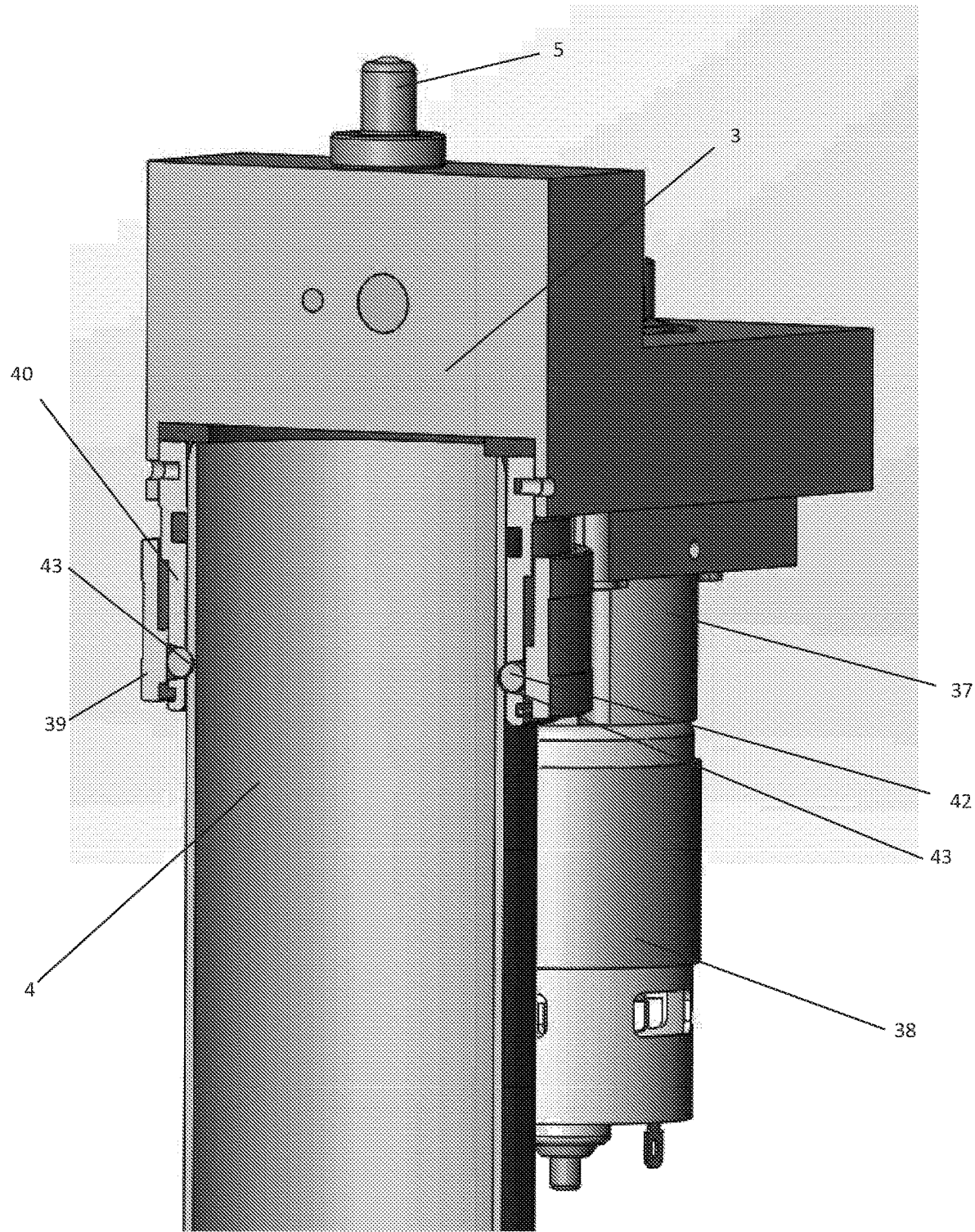
FIG. 19 is a cross section view of the grease gun of claim 1 showing the quick release barrel mechanism, with the mechanism in the locked position.
Figure 20:
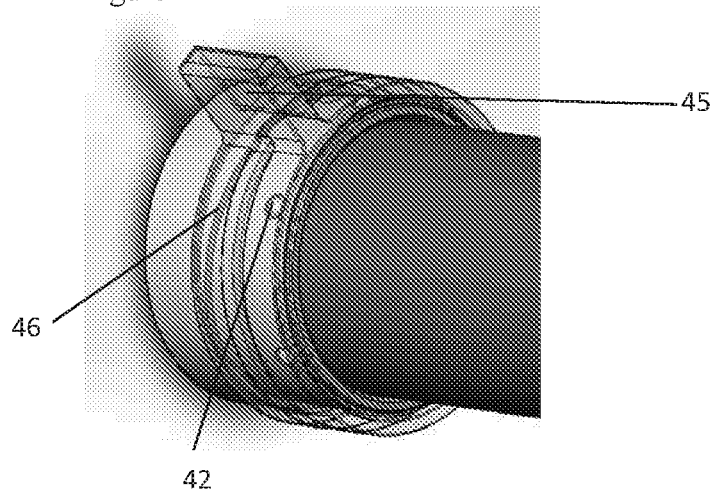
FIG. 20 is a side view of the quick release barrel mechanism of FIG. 19, with the mechanism in the locked position.
Figure 21:
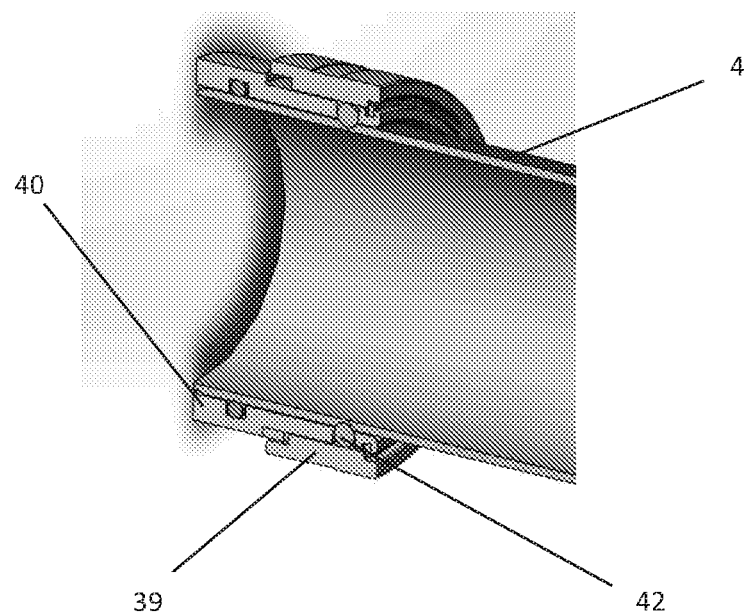
FIG. 21 is a cross section view of the quick release barrel mechanism of FIG. 20.
Figure 22:
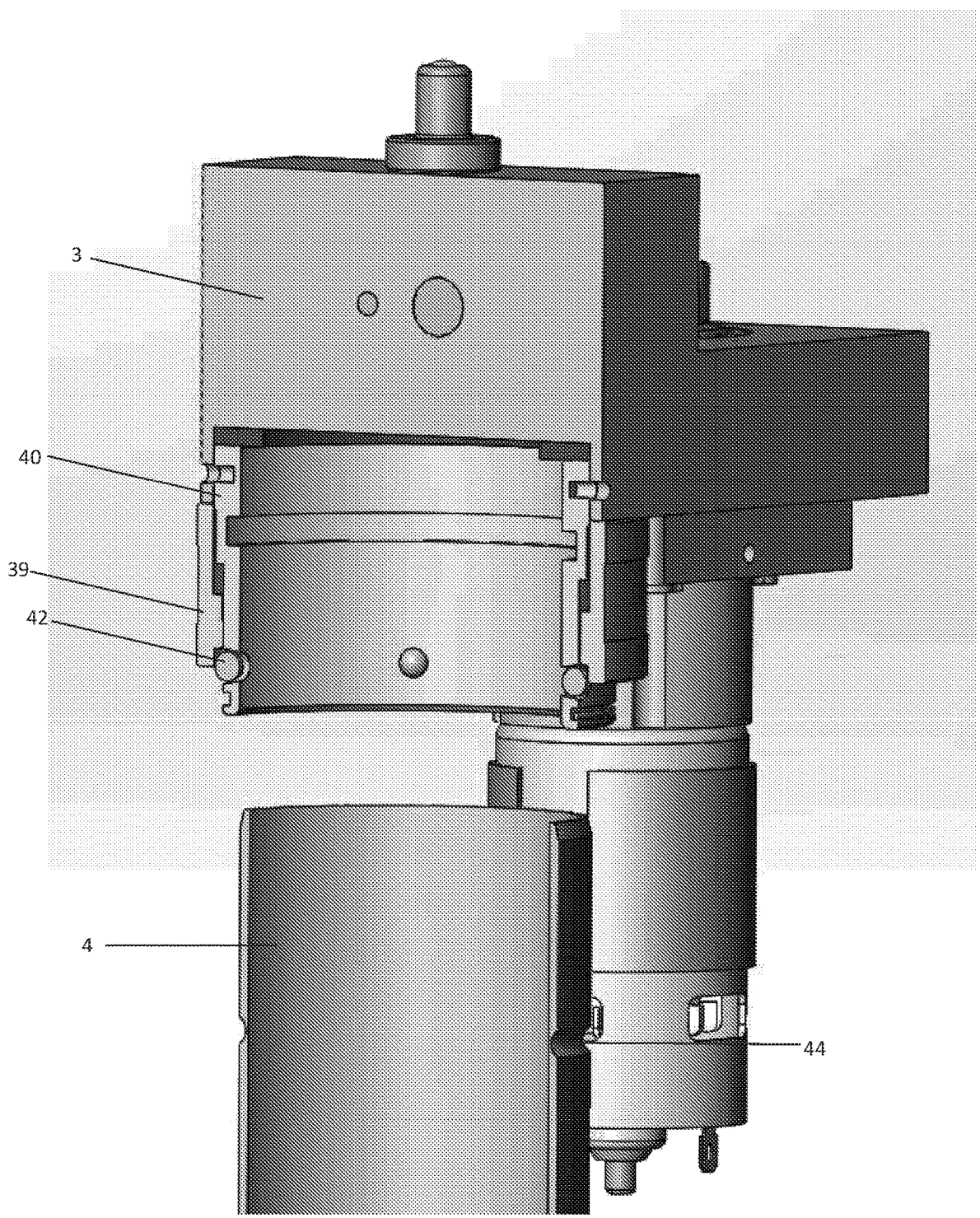
FIG. 22 is a cross section view of the grease gun of claim 1 showing the quick release barrel mechanism, with the mechanism in the unlocked position.
Figure 23:
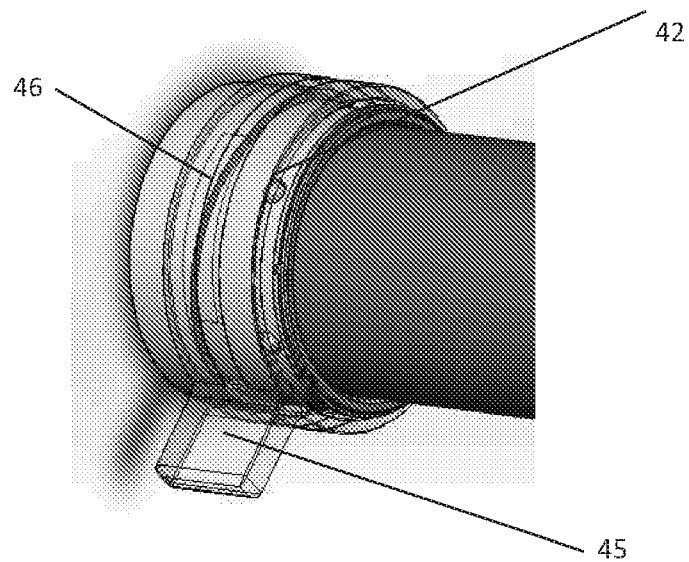
FIG. 23 is a side view of the quick release barrel mechanism of FIG. 22, with the mechanism in the locked position.
Figure 24:
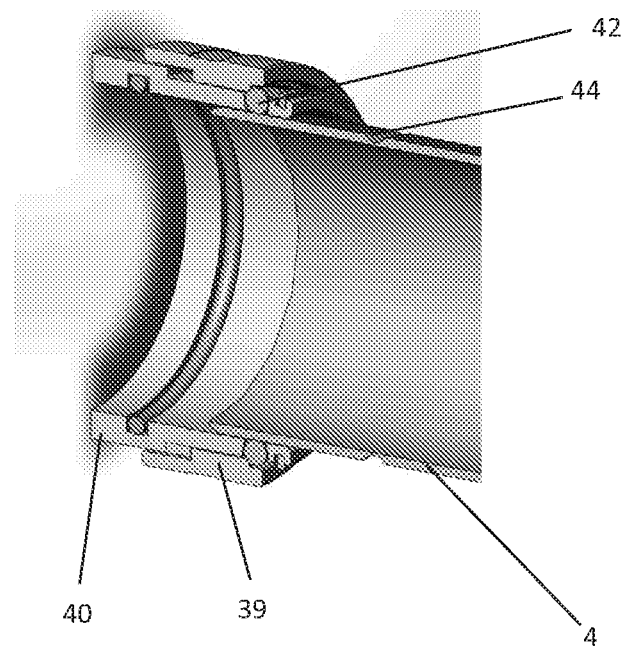
FIG. 24 is a cross section view of the quick release barrel mechanism of FIG. 23.
Figure 25:
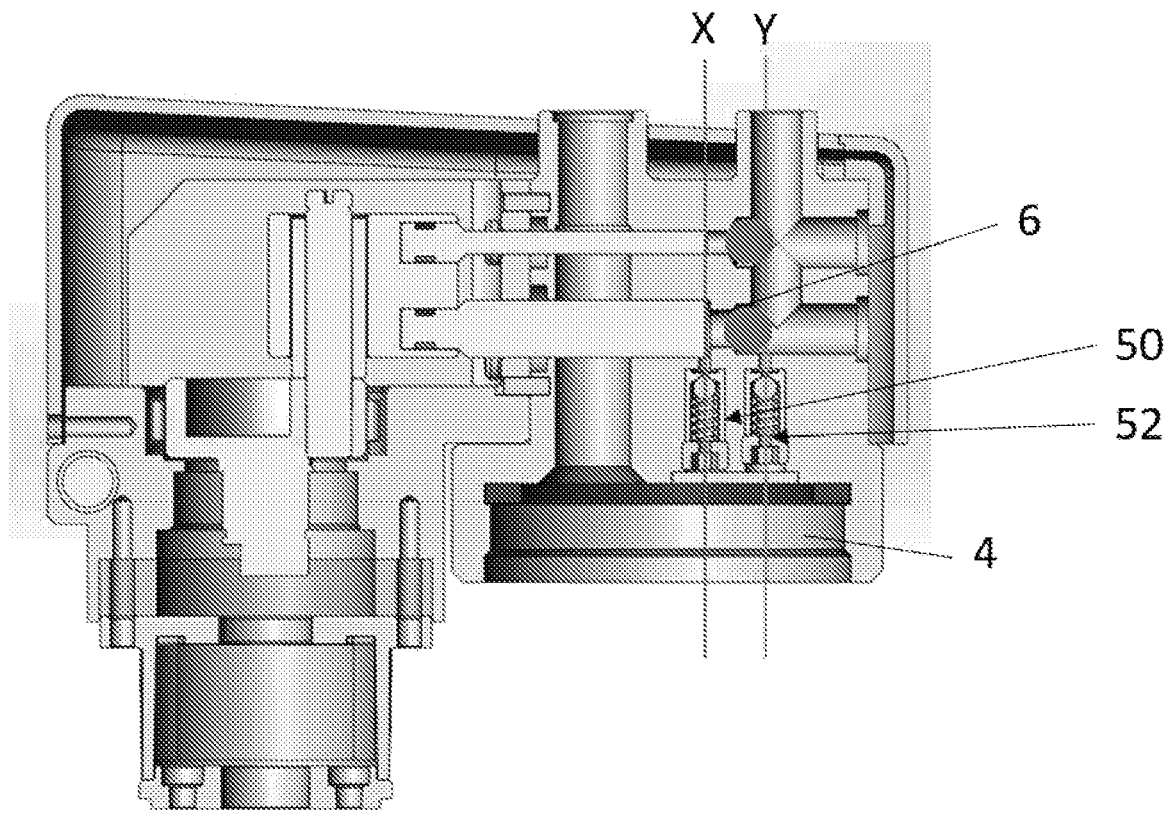
FIG. 25 is a cross sectional view through another embodiment of the grease gun.

In the embodiment of the present disclosure shown in FIGS. 19 to 24, there is further provided an engagement means on body 3 of grease gun 1 for attachment to corresponding engagement means on grease barrel 4. The engagement means on body 3 takes the form of outer collar 39 and inner collar 40. Outer collar 39 surrounds, and is axially movable on, inner collar 40, such that it is moveable between a locked position (as shown in FIGS. 19 to 21) and an unlocked position (as shown in FIGS. 22 to 24).

In the locked position, inner collar 40 can secure grease barrel 4 to body 3. In the unlocked position, inner collar 40 releases grease barrel 4 from body 3.

Inner collar 40 comprises collar ball channel 41, which extends around the circumference of inner collar 40. Within collar ball channel 41 are one or more (preferably two or more) collar locking balls 42. Collar locking balls 42 are located within pockets 43 of collar ball channel 41 and are held in their circumferential location by their locations within pockets 43. However, pockets 43 are open at either side of collar ball channel 41 and are narrower than collar locking balls 42 such that collar locking balls 42 have an engaged position within collar ball channel 41 in which they protrude into the inner side of inner collar 40 and a disengaged position where they instead protrude into the outer side of inner collar 40.

Outer collar 39 is axially moveable on inner collar 40 by tab 45, which radially extends from the surface of outer collar 39 so it can be engaged by a user to move outer collar 39 between the locked and unlocked positions. The inside of tab 45 is engageable with helical path 46 on inner collar 40 such that movement of tab 45 will move outer collar 39 with respect to inner collar 40 in both an axial and a transverse direction.

In the locked position, outer collar 39 is located on inner collar 40 in a position adjacent to collar ball channel 41. The movement of outer collar 39 to a position that is adjacent to collar ball channel 41 moves collar locking balls 42 within pockets 43 from their disengaged position to their engaged position.

In the unlocked position, outer collar 39 is located on inner collar 40 in a position away from collar ball channel 41. In this position, collar locking balls 42 are in the disengaged position.

Grease barrel 4 has a circumferential groove 44 which is engageable with collar locking balls 42 of collar ball channel 41. Groove 44 is located towards but not at the end of the section of grease barrel 4 that is inserted into inner collar 40. When grease barrel 4 is inserted into inner collar 40, if outer collar 39 is in the unlocked position, and therefore collar locking balls 42 are in the disengaged position, grease barrel 4 can be inserted within inner collar 40 the point where collar ball channel 41 is located adjacent to groove 44. Upon the movement of tab 45 to move outer collar 39 from the unlocked to the locked position, collar locking balls 42 will move to their engaged position and will extend into, and engage with, groove 45. The extension of collar locking balls 42 within groove 44 secures grease barrel 4 to body 3.

Upon further movement of tab 45 to move outer collar 39 from the locked to the unlocked position, collar locking balls 42 will retract within pockets 43 of collar ball channel 41, and retract with respect to groove 44 such that grease barrel 4 can be removed from body 3.

Electronically Monitored Pressure Relief Bypass Valves

A further embodiment of the grease gun disclosed herein will now be described with respect to FIGS. 25 to 30. This embodiment includes a hydraulic switch (pressure relief valve) 50, shown in the form of a non-return valve that enables the gun to switch between high pressure and high flow modes, that is similar to the hydraulic switch described above with respect to FIGS. 2 to 8. Similar to the embodiment described with respect to FIGS. 2 to 8, the hydraulic switch 50 is configured to bypass the flow of grease generated by the large piston back into the barrel when the pressure in the first chamber 6 is above around 3000 psi. As will be evident to the skilled addressee, the selection of the pressure could be made to suit a particular application.

In this embodiment, the hydraulic switch 50 is electronically monitored such that a user is able to determine if the hydraulic switch is open or closed. This embodiment includes another hydraulic switch (pressure relief valve) 52 that fluidically connects the outlet of the grease gun to the grease barrel 4. The hydraulic switch is the ultimate safety valve and is configured to open when the pressure at the outlet reaches the max rated pressure of the gun (e.g. 10,000 psi). The switch is therefore able to cut off the pressure generated by the gun at a maximum safe level (e.g. 10,000 psi).

Figure 26:
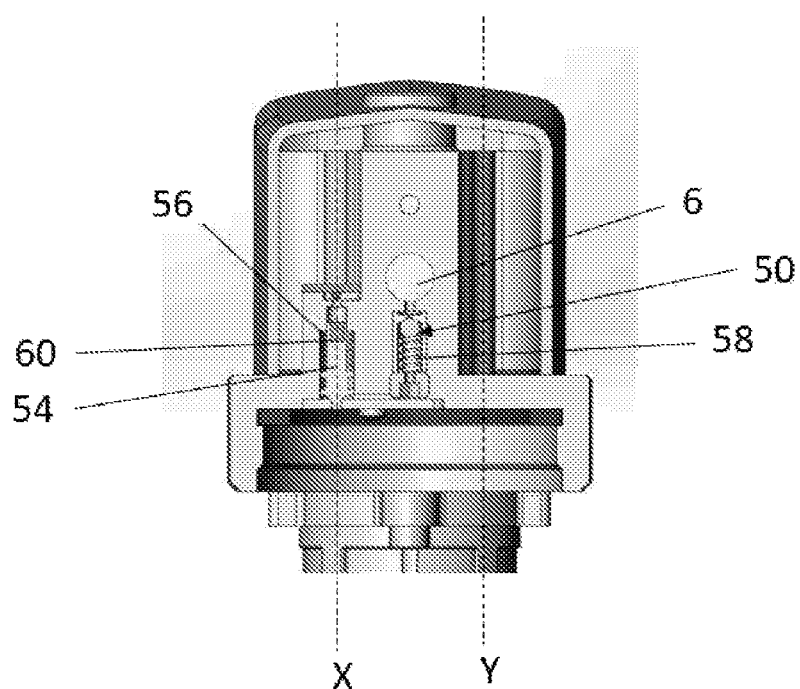
FIG. 26 is a cross sectional view through the grease gun shown in FIG. 25, showing a first hydraulic switch and a first proximity sensor.
Figure 27:
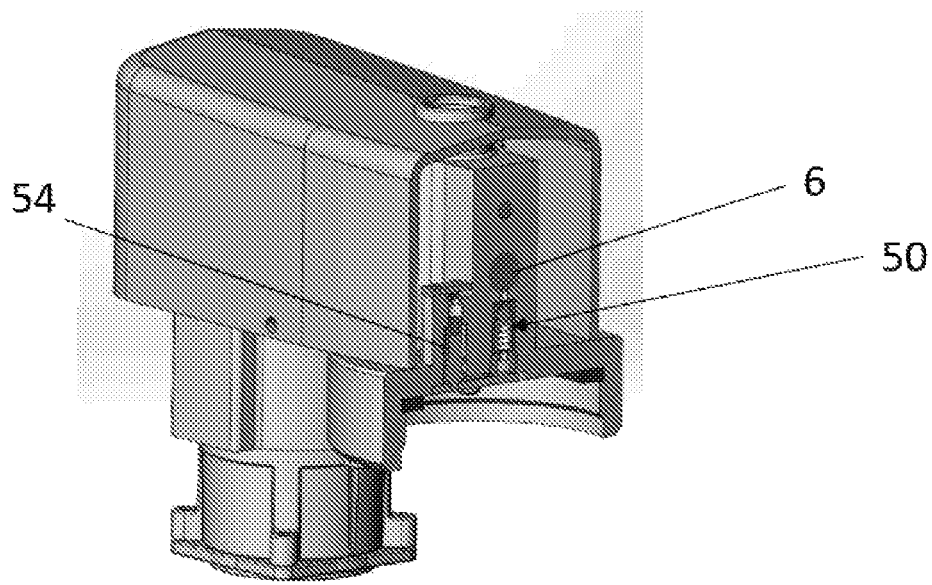
FIG. 27 is another cross sectional view through the grease gun shown in FIG. 25, also showing the a first hydraulic switch and a first proximity sensor.
Figure 28:
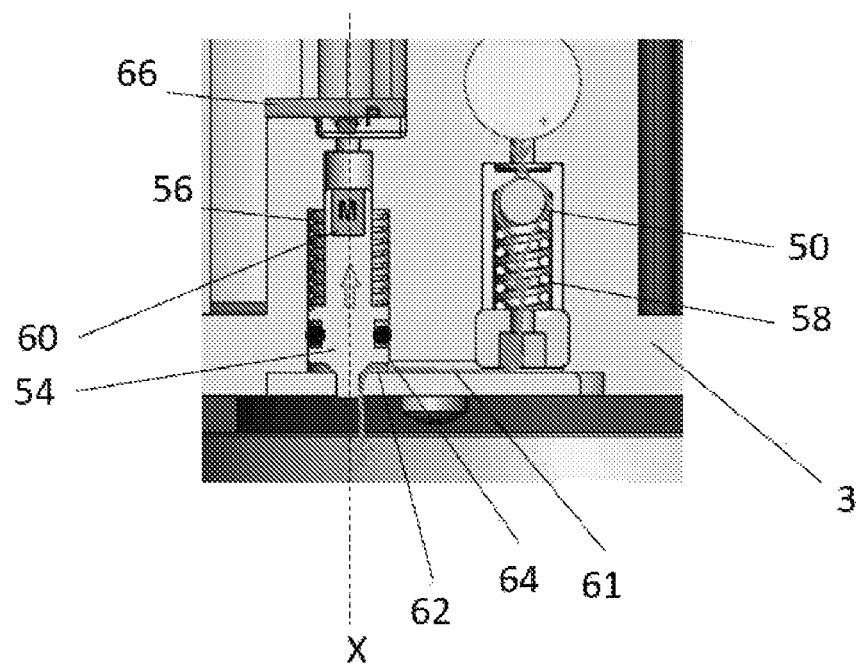
FIG. 28 is another cross sectional view through the grease gun shown in FIG. 25, showing a magnified view of the first hydraulic switching mechanism and first proximity sensor.

The hydraulic switch 50 (also referred to as a non-return valve 50) will now be described in further detail with respect to FIGS. 26-28. FIGS. 26-28 provide cross sectional views through the gun perpendicular to the pistons and through the hydraulic switch 50. In the detailed embodiment, the pressure relief valve 50 is configured to open at, for example, 3000 psi and then receives grease from the first chamber 6. A preloaded (e.g. metal) spool 54 is positioned in a spool chamber 56 positioned next to the chamber 58 within which the pressure relief valve 50 is positioned. The spool chamber extends along axis X. The chamber 58 extends along axis Y. Axis X is spaced from and substantially parallel to the axis Y. The spool 54 is biased towards a closed position, whereby the chamber 56 is isolated from the grease barrel (not shown) while being in permanent communication with the chamber 58 via channel 61, which is defined by the body 3 and connects chambers 56 and 58. Channel 61 is disposed at the lower end of the chambers 56, 58 and extends substantially parallel to the axes X and Y. The spool 54 is configured to translate within the chamber 56 along axis X.

The spool 54 includes a magnet 60. The magnet 60 is mounted to the spool 54 such that it is configured to be displaced from a rest position, which corresponds with the closed position of the spool 54 (as shown in FIGS. 26 and 27), towards a displaced position, as shown in FIG. 28. In the detailed embodiment, the magnet 60 is mounted to the upper end of the spool 54. The spool 54 is configured to be displaced by grease flowing through valve 50. In the displaced position, which is caused by grease from the 'open' pressure relief valve 50 filling the chamber 62 and therefore pushing the spool 54 upwards against the bias spring, the spool 54 and the magnet 60 are positioned away from the grease barrel (upwards in use) such that a channel 62 forms between a flange 64 and the body 3 of the grease gun. In this way, when the non-return valve 50 is open, grease is able to flow through a lower portion of the chamber 58, via the channel 62 and back into the grease barrel. A proximity sensor 66 is disposed above the magnet 60. The proximity sensor 66 is configured to detect the position of the magnet 60, and therefore is able to detect the movements of the spool 54.

A signal from the proximity sensor 66 is received by a controller (e.g. process control block—PCB). The signal provides information about the position of the hydraulic switch (e.g. information indicative of whether the hydraulic switch is in a position that corresponds with high pressure mode, or in a position that corresponds with high flow mode). For example, no signal may represent that the valve 50 is closed and therefore that the grease gun is operating in high flow mode, while a positive signal may represent that the valve 50 is open and therefore the grease gun is operating in high pressure mode. The information from the proximity sensor 66 is able to be used by the PCB to determine if grease is actually flowing to the outlet of the grease gun, or just being compressed in the line (e.g. if valve 50 is open while valve 52 is closed, the gun is in the process of building pressure by compressing the grease against a blockage (dummy greasing), until valve 52 eventually opens up when a max pressure is reached). The information can also be used by the electrical system of the grease gun to provide information on the grease gun, such as metering grease output (e.g. meter only in high flow mode and provide no metering in high pressure mode), and to inform a user of a blockage through a LCD display on the grease gun.

Figure 29:
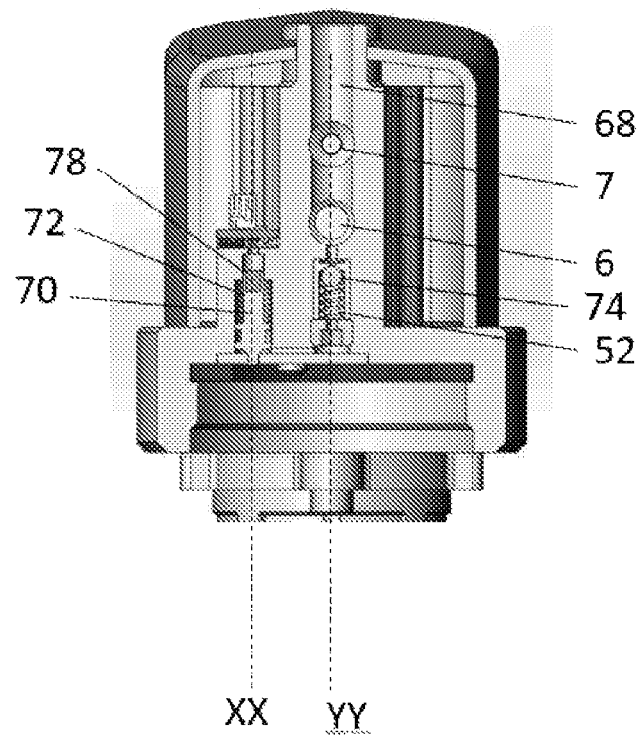
FIG. 29 is another cross sectional view through the grease gun shown in FIG. 25, showing a second hydraulic switch and a second proximity sensor.
Figure 30:
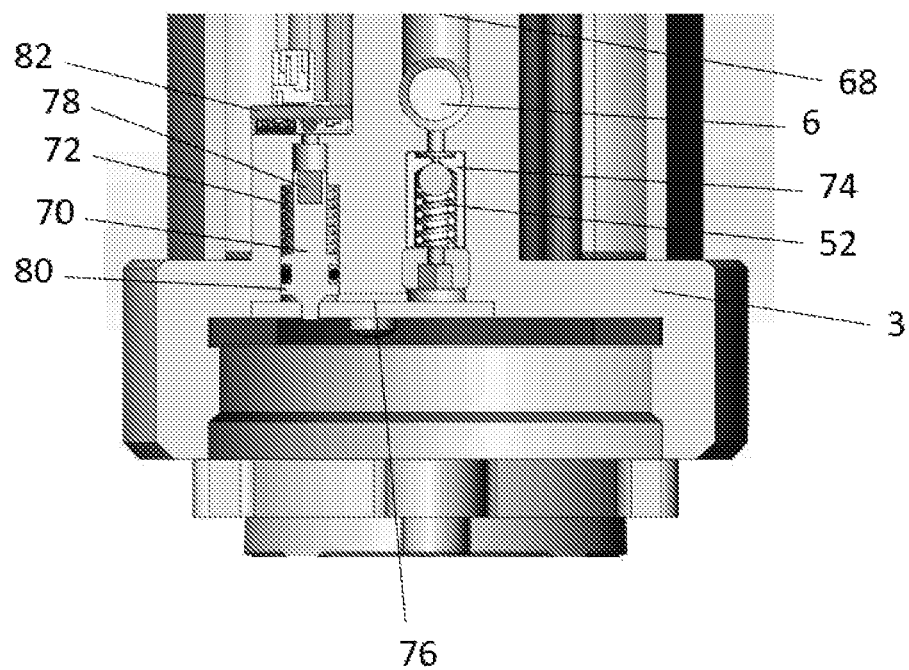
FIG. 30 is another cross sectional view through the grease gun shown in FIG. 25, also showing a second hydraulic switch and a second proximity sensor.

The hydraulic switch 52 (also referred to as a non-return valve 52) will now be described in further detail with respect to FIGS. 29 and 30. FIGS. 29 and 30 provide cross sectional views through the gun perpendicular to the pistons and through the hydraulic switch 52. In the detailed embodiment, the pressure relief valve 52 fluidically connects the outlet 68 of the grease gun to the grease barrel. As such, valve 52 is fluidically connected to the first 6 and second 7 piston chambers. The valve 52 operates as a safety valve and is configured to open when the pressure at the outlet reaches the max rated pressure of the gun (e.g. 10,000 psi). The valve 52 may be configured to limit to the maximum pressure that the grease gun is able to generate.

The valve 52 operates in a similar manner to the valve 50. A preloaded (e.g. metal) spool 70 is positioned in a spool chamber 72 positioned next to the chamber 74 within which the pressure relief valve 52 is positioned. The spool chamber 72 extends along axis XX. The chamber 74 extends along axis YY. Axis XX is spaced from and substantially parallel to the axis YY. The spool 70 is biased towards a closed position, whereby the chamber 72 is isolated from the grease barrel (not shown) while being in permanent communication with the chamber 74 via channel 76, which is defined by the body 3 and connects chambers 72 and 74. Channel 76 is disposed at the lower end of the chambers 72, 74 and extends substantially parallel to the axes XX and YY. The spool 70 is configured to translate within the chamber 72 along axis XX.

The spool 70 includes a magnet 78. The magnet 78 is mounted to the spool 70 such that it is configured to be displaced from a rest position (corresponds with the closed position of the spool 70) towards a displaced positioned, where the spool 70 translates within the channel 72 away from the grease barrel (e.g. upwards in use). The spool 70 is configured to be displaced by grease flowing through valve 52. In the detailed embodiment, the magnet 78 is mounted to the upper end of the spool 70. In the displaced position, which is caused by grease from 'open' pressure relief valve 52 filling the chamber 72 and therefore pushing the spool 70 upwards against the bias spring, the spool 70 and the magnet 78 are positioned away from the grease barrel (upwards in use) such that a channel 76 forms between a flange 80 and the body 3 of the grease gun. In this way, when the non-return valve 52 is open, grease is able to flow through a lower portion of the chamber 72, via the channel 76 and back into the grease barrel. A proximity sensor 82 is disposed above the magnet 78. The proximity sensor 82 is configured to detect the position of the magnet 78, and therefore is able to detect the movements of the spool 72.

A signal from the proximity sensor 82 is received by a process control block (PCB). The signal provides information about the position of the hydraulic switch. For example, no signal may represent that the valve 52 is closed, while a positive signal may represent that the valve 52 is open. The information from the proximity sensor 82 is able to be used by the PCB to, for example, inform the user through a LCD display that max pressure was reached and that a blockage could not be cleared. As an example, the PCB may be configured to cut the grease gun power off after 5 seconds of operating at max pressure and display a warning (e.g. 'dummy greasing') on an LCD display.

Figure 31:
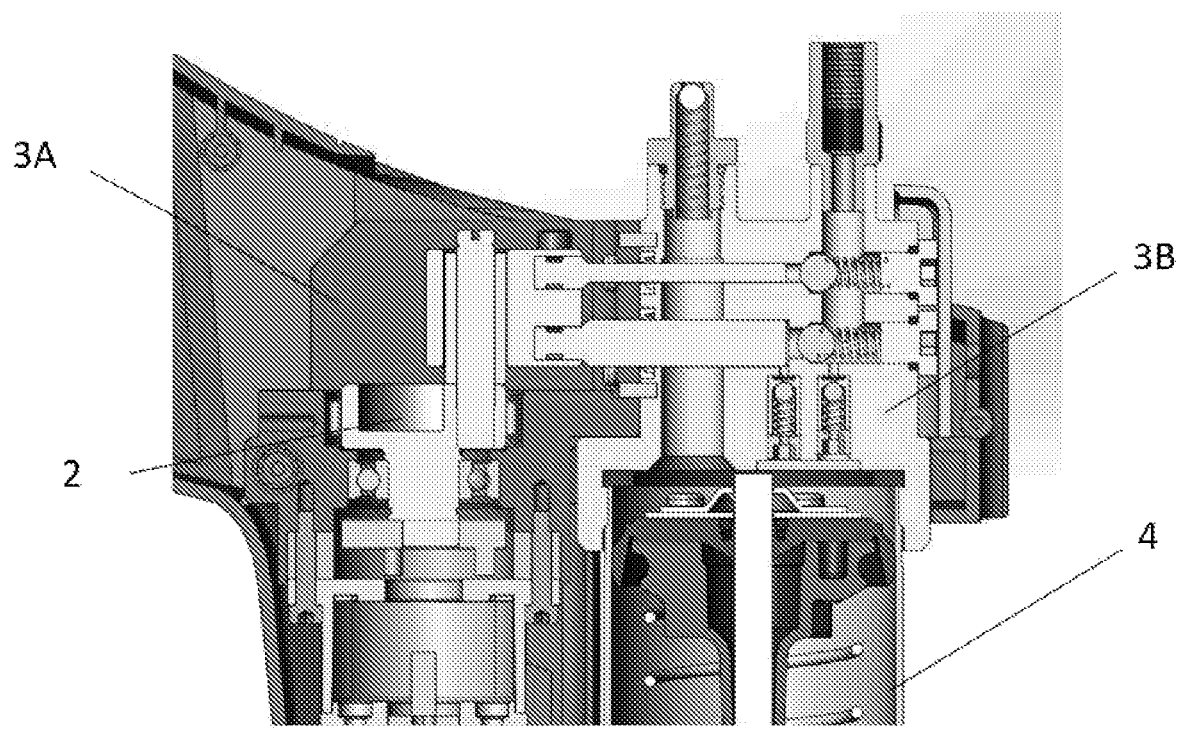
FIG. 31 is a cross sectional view though another embodiment of the grease gun.

As is shown in FIG. 31, the body 3 of the grease gun may be formed from two separate portions 3A, 3B, where portion 3A is disposed above the actuator 2 in use, and portion 3B is disposed above the barrel 4 in use. Splitting the gun body into two separate portions facilitates manufacturing of high accuracy features (e.g. piston chambers) as well as allowing for the use of varying construction materials to best suits the level of mechanical stress required (e.g 'front' housing 3B, which may be subject to high grease pressure and wear and tear from piston reciprocation may be made of steel, while 'rear' housing 3A which supports the motor, gearbox and crank wheel may be made of aluminium). The provision of a steel front housing 3B also provides the advantage of more durable outlet check valves (steel balls sit on a steel sealing edge as opposed to, for example, easy to damage aluminium).

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The invention claimed is:

1. A battery operated grease gun comprising:
   a body able to be connected to a container configured to store grease, the body defining first and second elongate chambers therein, a chamber extending along a first axis and a second chamber extending along a second axis, the first axis being spaced from the second axis, and the second chamber having a smaller cross-sectional area than the first chamber;
   first and second pistons, the first piston configured to reciprocate within the first chamber along the first axis and the second piston configured to reciprocate within the second chamber along the second axis, the second piston having a smaller cross-sectional area than the first piston;
   a common grease channel, the common grease channel being disposed between the container and the first and second chambers such that the grease is able to flow from the container into the first and second chambers;
   an actuator connected to the body and moveable between a retracted position, whereby grease is able to flow through the common grease channel, and an engaged position, whereby grease is restricted from flowing through the common grease channel, the actuator being configured to cause reciprocation of the first piston and the second piston when moved between the engaged and retracted positions;
   a grease outlet fluidically connected to the first and second chambers that allows for grease to be discharged from the grease gun;
   a first pressure relief channel that fluidically connects the first chamber to the container;
   a first pressure relief valve disposed within the first pressure relief channel, the first pressure relief valve being configured to open and thereby allow grease to flow from the first chamber to the container when the pressure in the first chamber is at or above a predetermined pressure;
   a first monitoring channel spaced from the first pressure relief channel;
   a connecting channel that fluidically connects the first monitoring channel to the first pressure relief channel; and
   a first monitoring spool disposed within the first monitoring channel, the first monitoring spool being configured to translate within the first monitoring channel along a longitudinal axis of the first monitoring channel between a closed and open position, wherein when the first monitoring spool is in the open position, grease is able to flow from the first chamber to the container via the connecting channel.

2. The grease gun of claim 1, wherein the grease outlet is fluidically connected to the first chamber and the second chamber by way of a third chamber connected to the first chamber and a fourth chamber connected to the second chamber, and the first chamber is connected to the third chamber by way of a first grease channel.

3. The grease gun of claim 2, further comprising a first non-return valve located within the first grease channel which permits grease to flow from the first chamber through the first grease channel into the third chamber.

4. The grease gun of claim 3, wherein the second chamber is connected to the fourth chamber by way of a second grease channel.

5. The grease gun of claim 4, further comprising a second non-return valve located within the second grease channel which permits grease to flow from the second chamber through the second grease channel into the fourth chamber.

6. The grease gun of claim 1, wherein the actuator is configured to cause reciprocation of the first and second pistons in the same phase when moved between the engaged and retracted positions.

7. The grease gun of claim 1 further comprising;
a first magnet mounted to the first monitoring spool; and
a first proximity sensor disposed adjacent the magnet, the first proximity sensor being configured to generate a first signal that is indicative of the position of the magnet.

8. The grease gun of claim 7 further comprising;
a second pressure relief channel that fluidically connects the grease outlet to the container; and
a second pressure relief valve disposed within the second pressure relief channel, the second pressure relief valve being configured to open and thereby allow grease to flow from the grease outlet to the container when the pressure in the grease outlet is at or above a predetermined pressure.

9. The grease gun of claim 8 further comprising;
a second monitoring channel spaced from the second pressure relief channel;
a second connecting channel that fluidically connects the second monitoring channel to the second pressure relief channel; and
a second monitoring spool disposed within the second monitoring channel, the second monitoring spool being configured to translate within the second monitoring channel along a longitudinal axis of the second monitoring channel between a closed and open position, wherein when the second monitoring spool is in the open position, grease is able to flow from the grease outlet to the container via the second connecting channel.

10. The grease gun of claim 9 further comprising;
a second magnet mounted to the second monitoring spool; and
a second proximity sensor disposed adjacent the second magnet, the second proximity sensor being configured to generate a second signal that is indicative of the position of the second magnet.

11. The grease gun of claim 10, further comprising;
a controller configured to receive the first and second signals, the controller being configured to determine information about the grease gun in dependence on the first and second signals; and
an LCD configured to display the determined information.

* * * * *